United States Patent
Kanamoto et al.

(10) Patent No.: US 9,311,574 B2
(45) Date of Patent: Apr. 12, 2016

(54) PRINTING APPARATUS AND METHOD OF CONTROLLING THE SAME, AND STORAGE MEDIUM

(71) Applicant: CANON KABUSHIKI KAISHA, Tokyo (JP)

(72) Inventors: Yoshiji Kanamoto, Tokyo (JP); Hisashi Koike, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/727,562

(22) Filed: Jun. 1, 2015

(65) Prior Publication Data

US 2015/0262041 A1 Sep. 17, 2015

Related U.S. Application Data

(63) Continuation of application No. 14/095,875, filed on Dec. 3, 2013, now Pat. No. 9,058,555.

(30) Foreign Application Priority Data

Dec. 14, 2012 (JP) .................................. 2012-274054
Jun. 11, 2013 (JP) .................................. 2013-123174

(51) Int. Cl.
*G06K 15/02* (2006.01)
*G06F 3/12* (2006.01)
*G06K 15/16* (2006.01)
*G06K 15/00* (2006.01)
*H04N 1/00* (2006.01)

(52) U.S. Cl.
CPC ................ *G06K 15/16* (2013.01); *G06F 3/121* (2013.01); *G06F 3/1204* (2013.01); *G06F 3/1235* (2013.01); *G06F 3/1255* (2013.01); *G06F 3/1285* (2013.01); *G06K 15/1814* (2013.01); *G06K 15/1823* (2013.01); *G06K 15/1827* (2013.01); *G06K 15/402* (2013.01); *G06K 15/4065* (2013.01); *H04N 1/00779* (2013.01)

(58) Field of Classification Search
CPC .... G06F 3/1285; G06F 3/1259; G06F 3/1288; G06F 3/1204; G06F 21/608
USPC .................................................. 358/1.9, 1.15
See application file for complete search history.

(56) References Cited

U.S. PATENT DOCUMENTS

| | | |
|---|---|---|
| 7,149,444 B2 | 12/2006 | Tanaka |
| 8,947,683 B2 | 2/2015 | Tominaga |
| 9,102,173 B2 | 8/2015 | Umeda |
| 2003/0090696 A1 | 5/2003 | Willis et al. |
| 2007/0046995 A1 | 3/2007 | Toda |
| 2008/0075491 A1 | 3/2008 | Tao |
| 2009/0225343 A1 | 9/2009 | Tominaga |
| 2011/0063682 A1 | 3/2011 | Kanamoto |
| 2011/0164275 A1 | 7/2011 | Mikura |
| 2013/0341861 A1 | 12/2013 | Kanamoto |

FOREIGN PATENT DOCUMENTS

| | | |
|---|---|---|
| JP | 2011-9981 A | 1/2011 |
| JP | 2011-56749 A | 3/2011 |
| KR | 10-2009-0097128 A | 9/2009 |

*Primary Examiner* — Charlotte M Baker
(74) *Attorney, Agent, or Firm* — Fitzpatrick, Cella, Harper & Scinto

(57) ABSTRACT

There are provided a printing apparatus which holds a job, determines whether attribution information of a sheet to be used by the stored job is registered for a sheet storage unit, judges whether a sheet exists in a sheet storage unit to be used by the job, and notifies a result of the determination and a result of the judgment.

12 Claims, 34 Drawing Sheets

FIG. 8

| FEED UNIT ID | SIZE | SHEET TYPE | AMOUNT OF REMAINING SHEETS |
|---|---|---|---|
| 1 | A4 | PLAIN PAPER 1 | 3 |
| 2 | A4 | COLORED PAPER(RED) | 1 |
| 3 | A3 | PLAIN PAPER 1 | 2 |
| 4 | B4 | PLAIN PAPER 1 | 0 |
| 5 | B5 | PLAIN PAPER 1 | 3 |
| 6 | A4 | INDEX PAPER | 3 |
| 7 | LTR | PLAIN PAPER 1 | 1 |
| 8 | A4 | DOUBLE-SIDE COATED PAPER 1 | 1 |
| 9 | 11×17 | PLAIN PAPER 1 | 0 |
| 10 | A3 | THICK PAPER 2 | 0 |

FIG. 9A

Job A

| SIZE | SHEET TYPE |
| --- | --- |
| A4 | PLAIN PAPER 1 |
| A4 | DOUBLE-SIDE COATED PAPER 1 |

FIG. 9B

Job D

| SIZE | SHEET TYPE |
| --- | --- |
| LTR | PLAIN PAPER 1 |
| 11×17 | PLAIN PAPER 1 |

FIG. 9C

Job E

| SIZE | SHEET TYPE |
| --- | --- |
| A4 | PLAIN PAPER 1 |
| A4 | COLORED PAPER(RED) |
| A3 | DOUBLE-SIDE COATED PAPER 2 |

FIG. 10

HOLD

■ HOLD JOB LIST

| | JOB NAME | USER NAME | DATE/TIME |
|---|---|---|---|
| ✓ | Job A | Operator A | 07/18 09:00 AM |
| | Job B | Operator C | 07/18 09:12 AM |
| | Job C | Operator B | 07/18 09:41 AM |
| | Job D | Operator A | 07/18 10:15 AM |
| | Job E | Operator A | 07/18 10:29 AM |
| | Job F | Operator B | 07/18 10:55 AM |

704 ✎

☐ DISPLAY ONLY SELECTED USERS

707 DETAILS/CHANGE ▸

705 ◀ ▶

☐ SELECT ALL (UP TO 100)

☐ DELETE AFTER PRINTING

706 ┊ 708 PRINT START

■ PRINT JOB LIST

| TIME | JOB NAME | STATUS | WAITING TIME(ABOUT) |
|---|---|---|---|

◀ ▶

DETAILS/CHANGE ▸

709 STOP

SYSTEM MANAGEMENT MODE

LOG OUT 1001, 702, 1002, 1003, 1004

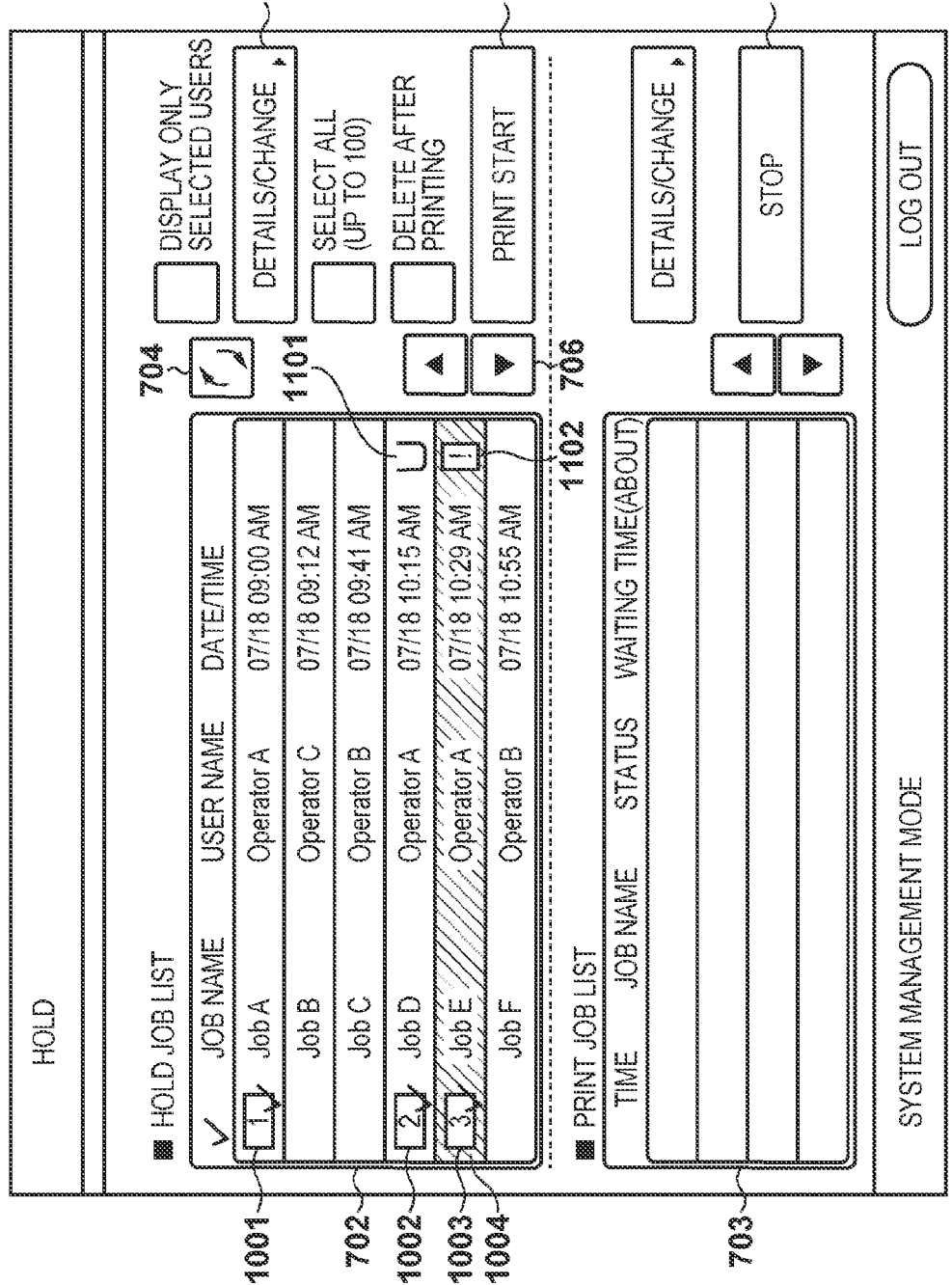

F I G. 12

| FEED UNIT ID | SIZE | SHEET TYPE | AMOUNT OF REMAINING SHEETS |
|---|---|---|---|
| 1 | A4 | PLAIN PAPER 1 | 3 |
| 2 | A4 | COLORED PAPER(RED) | 1 |
| 3 | A3 | PLAIN PAPER 1 | 2 |
| 4 | A3 | DOUBLE-SIDE COATED PAPER 2 | 3 |
| 5 | B5 | PLAIN PAPER 1 | 3 |
| 6 | A4 | INDEX PAPER | 3 |
| 7 | LTR | PLAIN PAPER 1 | 1 |
| 8 | A4 | DOUBLE-SIDE COATED PAPER 1 | 1 |
| 9 | 11×17 | PLAIN PAPER 1 | 3 |
| 10 | A3 | THICK PAPER 2 | 0 |

F I G. 14B
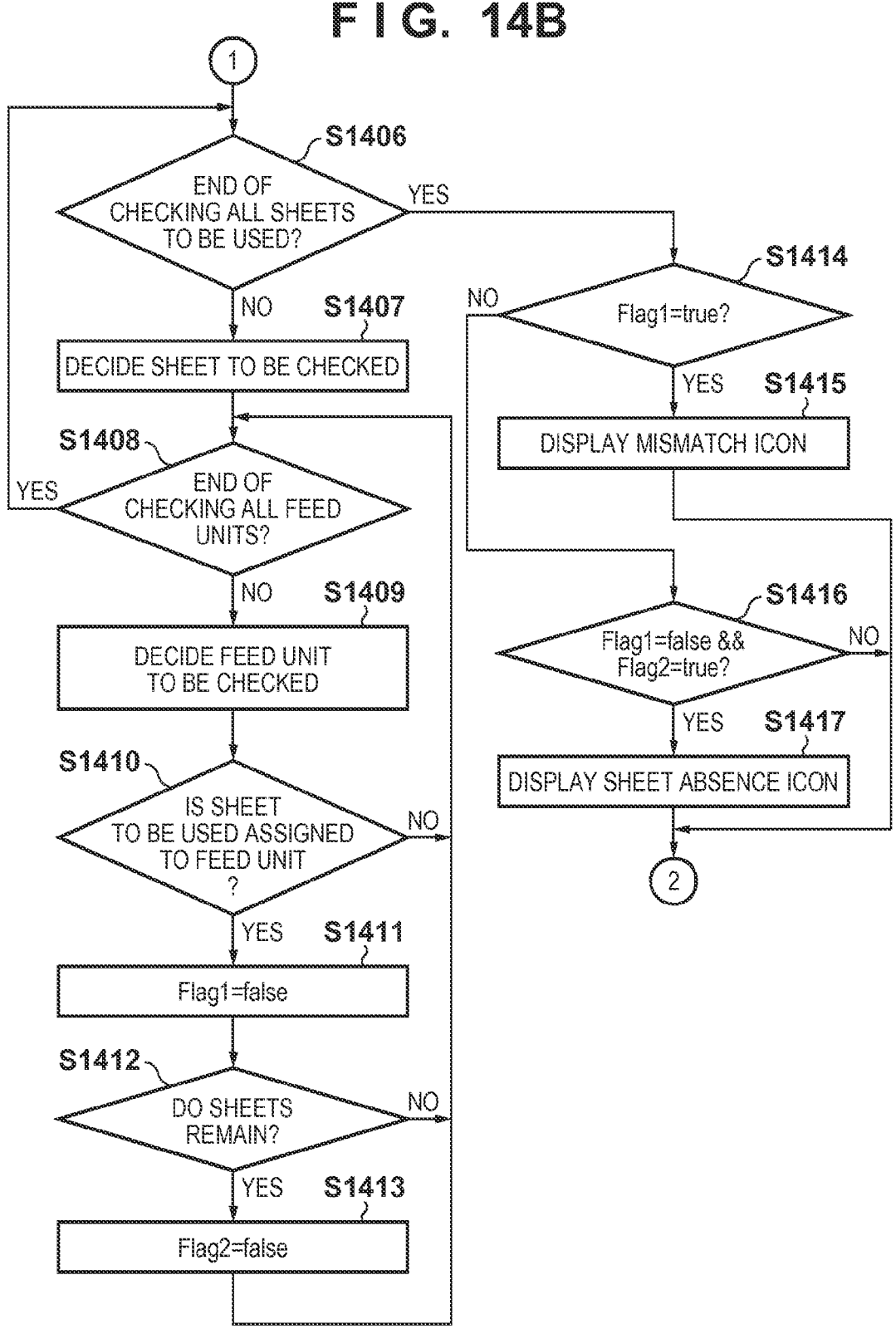

FIG. 15

HOLD

■ HOLD JOB LIST — 702

| | JOB NAME | USER NAME | DATE/TIME | |
|---|---|---|---|---|
| ✓ | Job A | Operator A | 07/18 09:00 AM | |
| 1 | Job B | Operator C | 07/18 09:12 AM | |
| | Job C | Operator B | 07/18 09:41 AM | |
| 2 | Job D | Operator A | 07/18 10:15 AM | |
| 3 | Job E | Operator A | 07/18 10:29 AM | 1503 |
| | Job F | Operator B | 07/18 10:55 AM | |

1504

704 ↻

☐ DISPLAY ONLY SELECTED USERS — 707

[ DETAILS/CHANGE ▸ ]

☐ SELECT ALL (UP TO 100)
☐ DELETE AFTER PRINTING

[ PRINT START ]

■ PRINT JOB LIST — 703

| TIME | JOB NAME | STATUS | WAITING TIME (ABOUT) |
|---|---|---|---|

◀ ▶

[ DETAILS/CHANGE ▸ ]

◀ ▶

[ STOP ]

SYSTEM MANAGEMENT MODE ( LOG OUT )

F I G. 16B
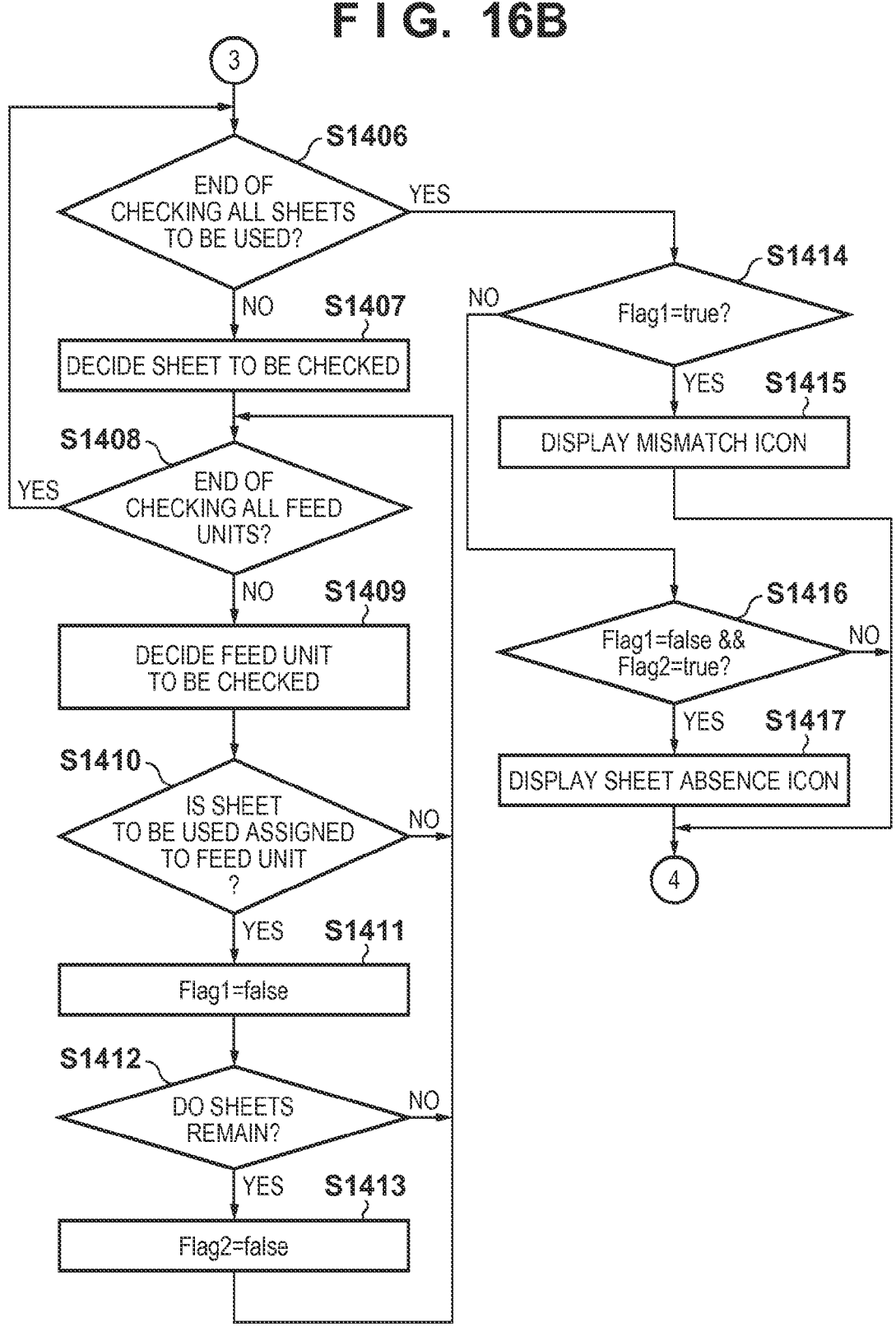

FIG. 17

HOLD

■ HOLD JOB LIST

| | JOB NAME | USER NAME | DATE/TIME | | |
|---|---|---|---|---|---|
| ✓ 1 | Job A | Operator A | 07/18 09:00 AM | | |
| | Job B | Operator C | 07/18 09:12 AM | | |
| | Job C | Operator B | 07/18 09:41 AM | | |
| | Job D | Operator A | 07/18 10:15 AM | | |
| 2 | Job E | Operator A | 07/18 10:29 AM | 1503 | |
| | Job F | Operator B | 07/18 10:55 AM | 1504 | |

702

704

☐ DISPLAY ONLY SELECTED USERS

DETAILS/CHANGE ▸

☐ SELECT ALL (UP TO 100)

☐ DELETE AFTER PRINTING

PRINT START

■ PRINT JOB LIST

| TIME | JOB NAME | STATUS | WAITING TIME (ABOUT) |
|---|---|---|---|
| | | | |
| | | | |
| | | | |

DETAILS/CHANGE ▸

STOP

LOG OUT

SYSTEM MANAGEMENT MODE

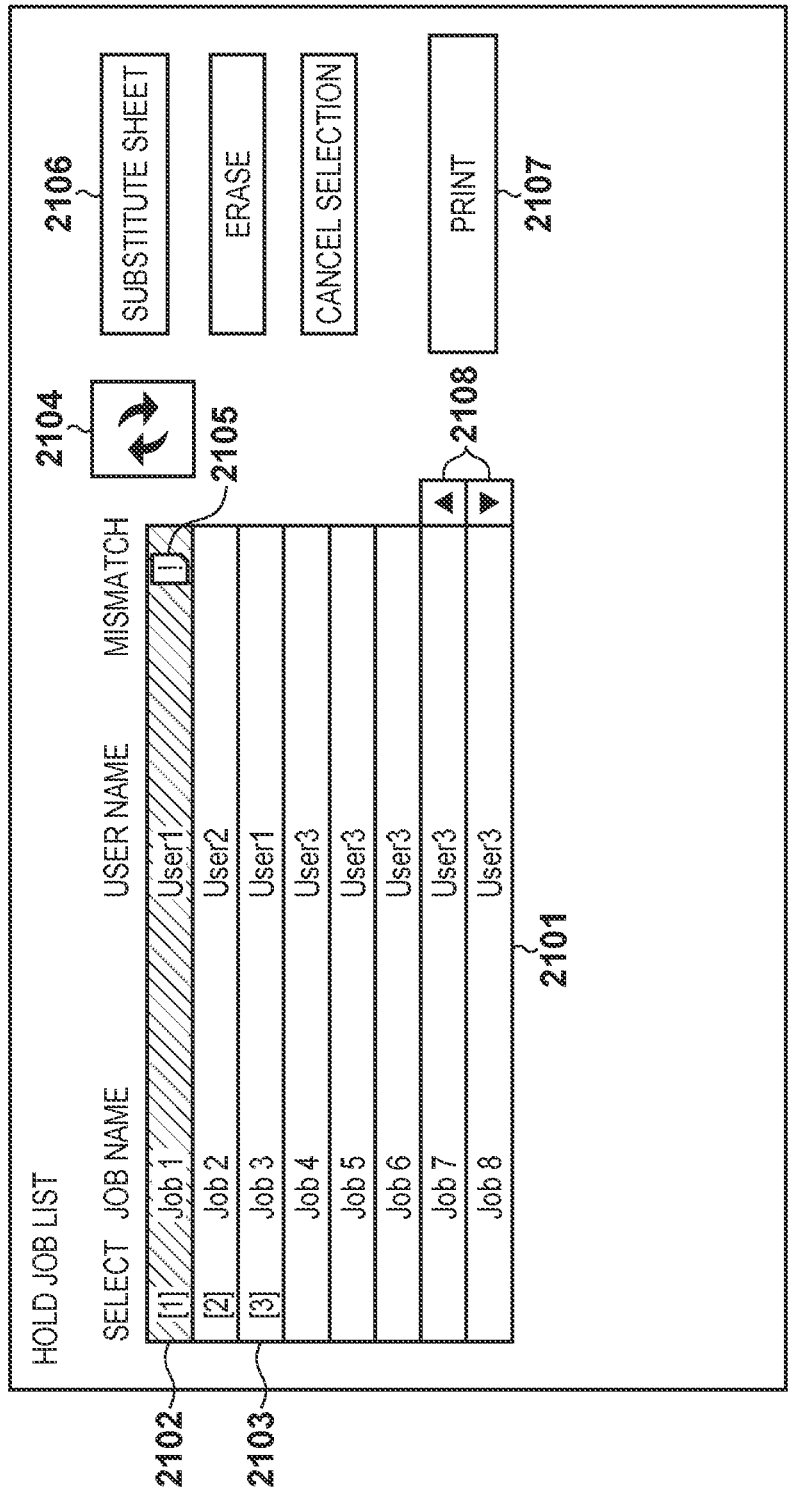

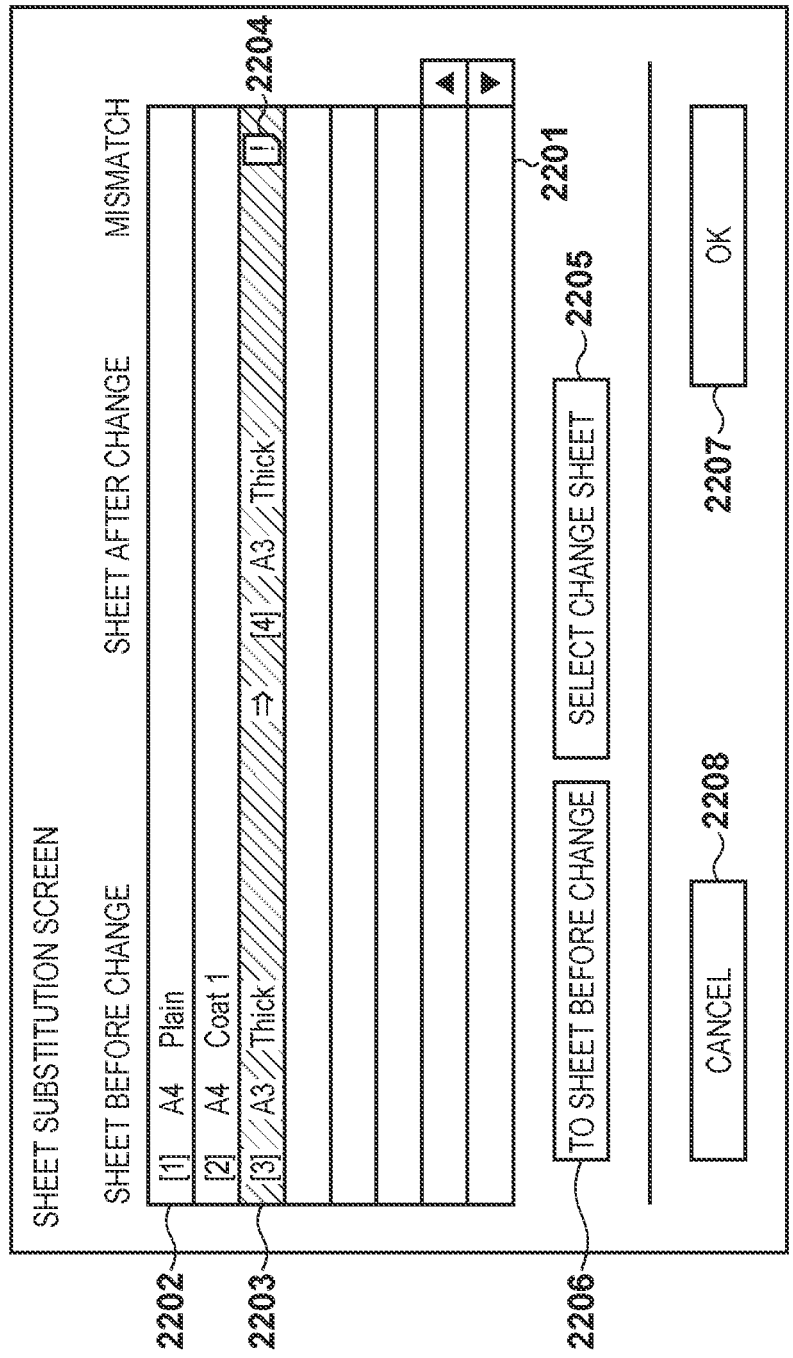

F I G. 23A
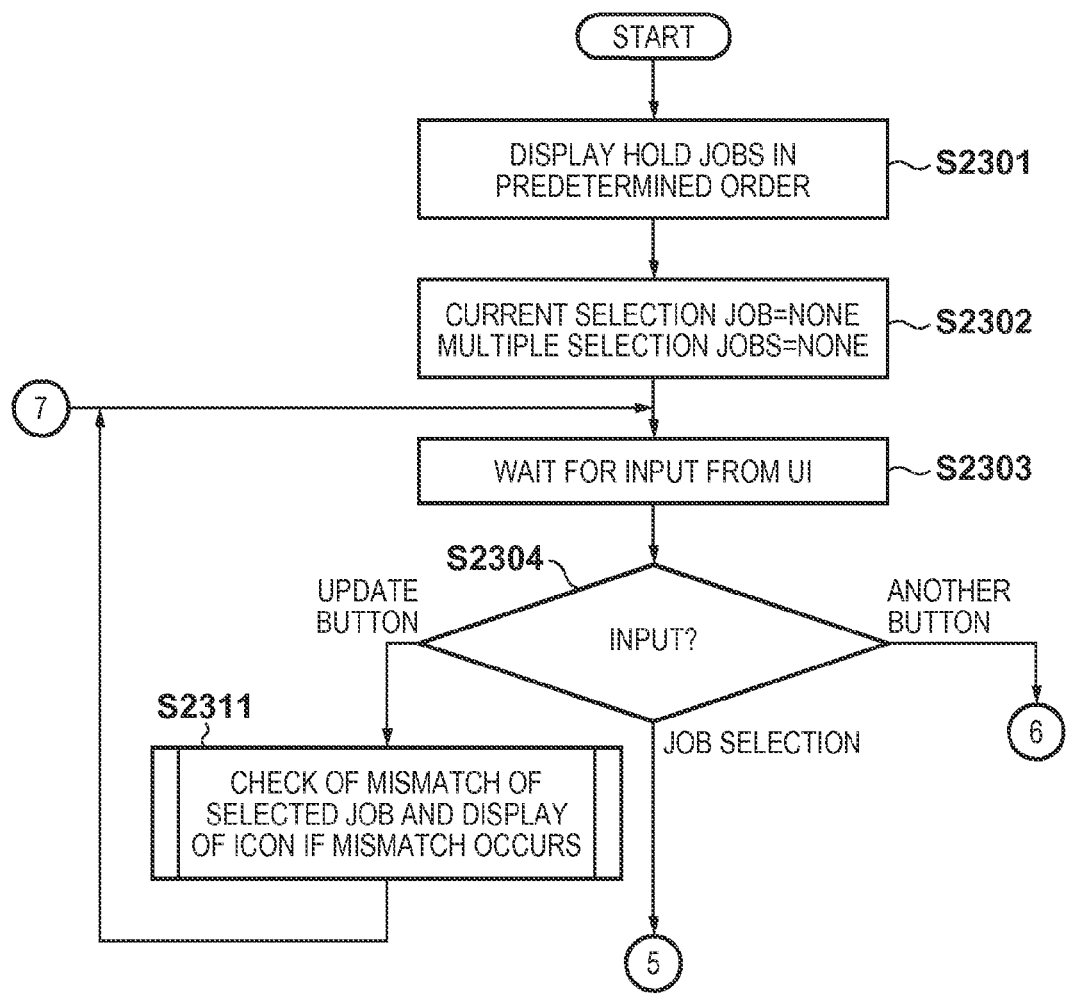

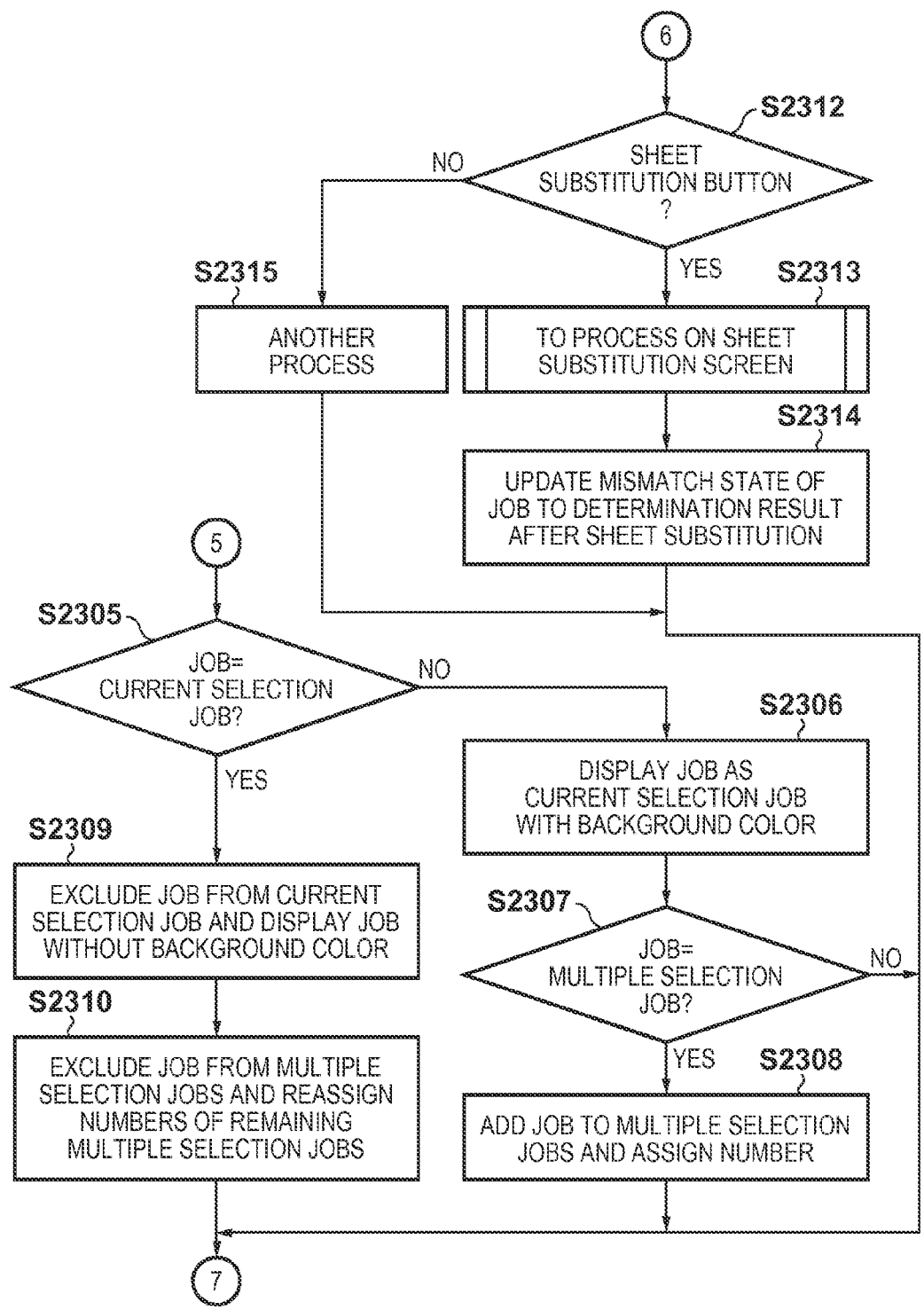

F I G. 27B
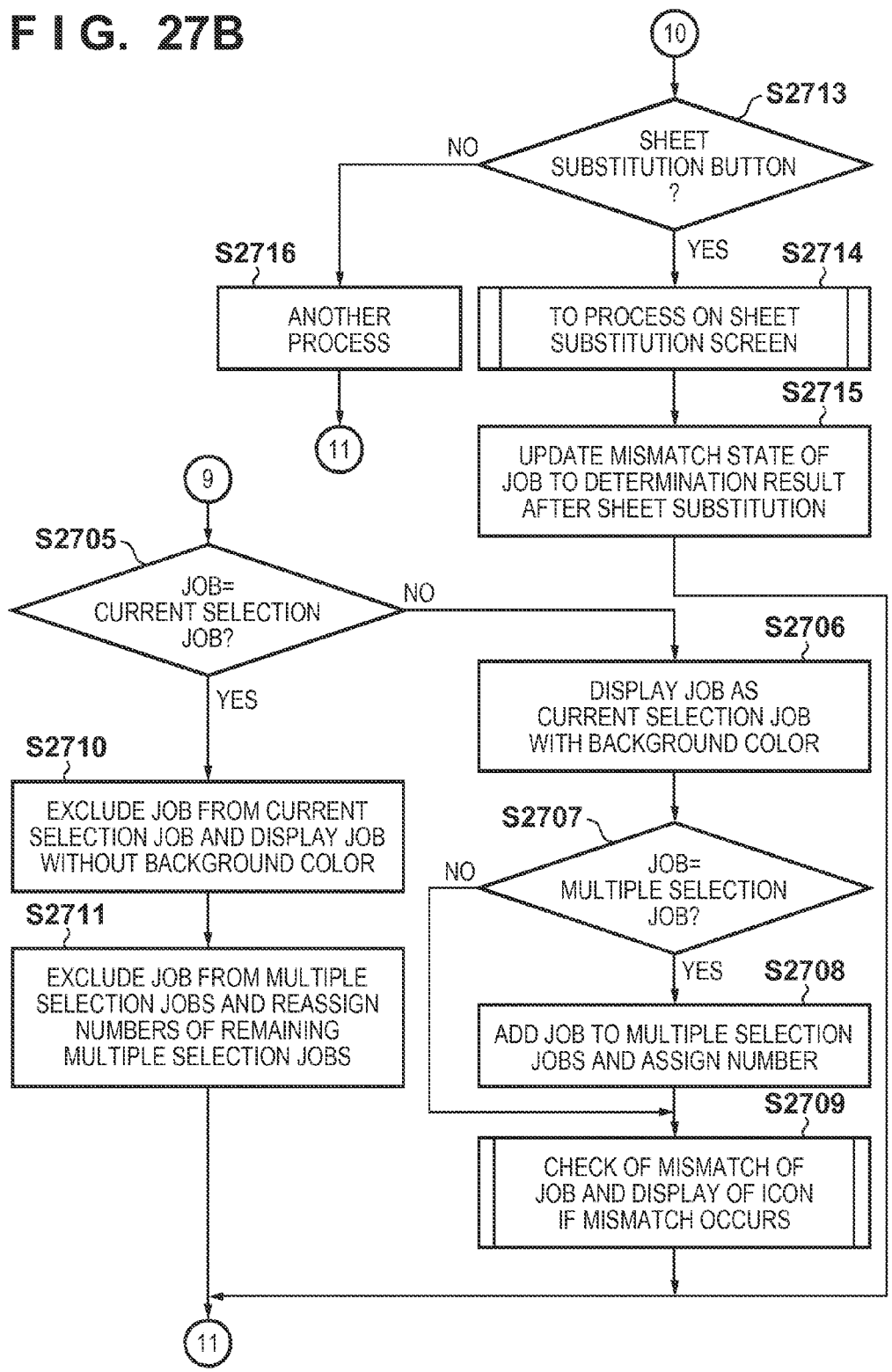

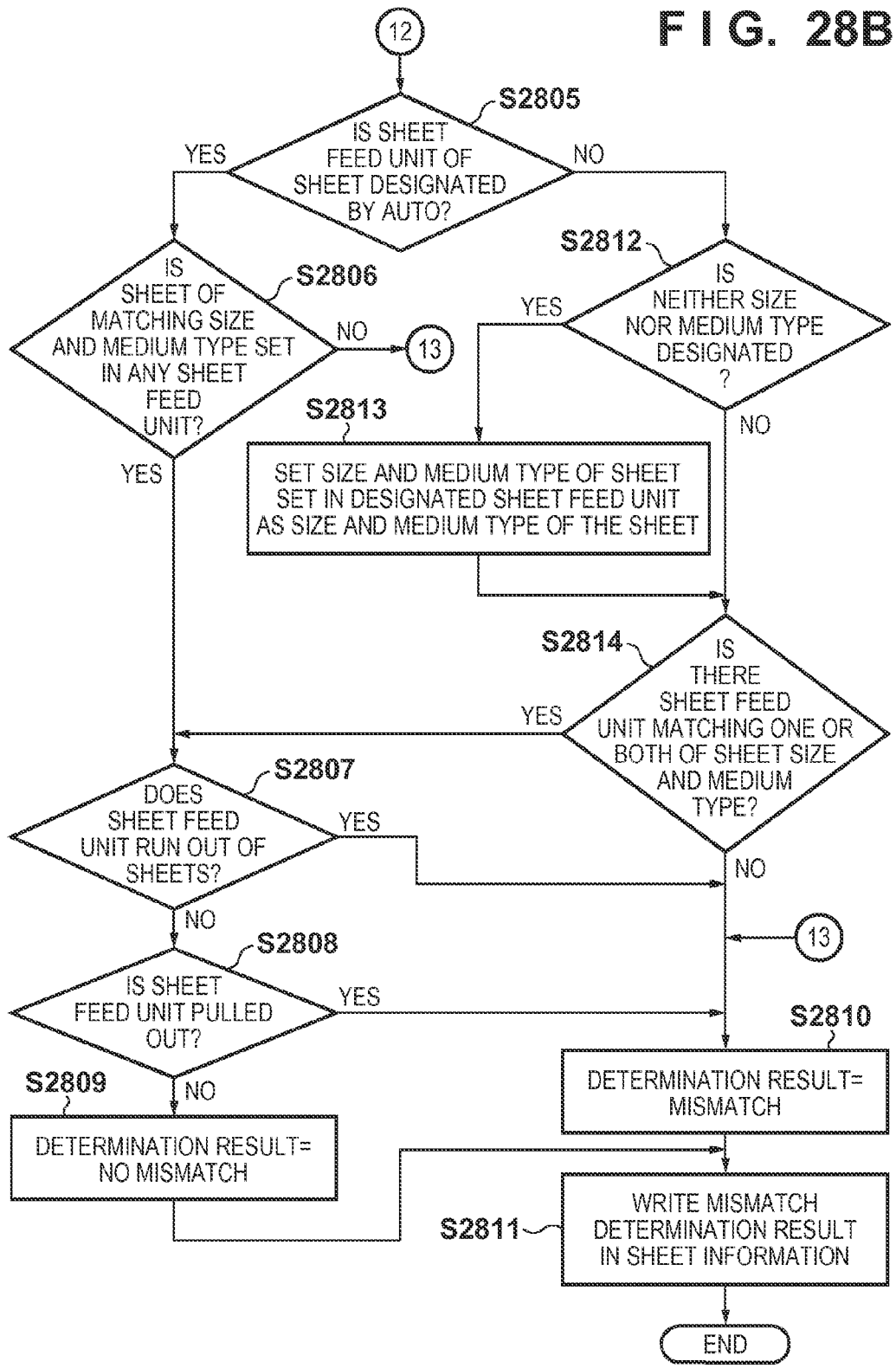

PRINTING APPARATUS AND METHOD OF CONTROLLING THE SAME, AND STORAGE MEDIUM

This application is a continuation of U.S. application Ser. No. 14/095,875 filed Dec. 3, 2013, the contents of which are incorporated herein by reference.

BACKGROUND OF THE INVENTION

1. Field of the Invention

The present invention relates to a printing apparatus capable of saving a print job and executing the saved print job, a method of controlling the same, and a storage medium.

2. Description of the Related Art

Conventionally, there is a printing apparatus which supports a plurality of types of media (sheets). This printing apparatus can create a complicated high-value-added output material by using a plurality of types of sheets. For example, the printing apparatus uses high-quality sheets using coated paper as front and back covers to perform high-quality printing, uses wood-free paper as inner sheets, and uses colored paper as interleaved sheets used for pages at boundaries between the chapters of contents. As another example, a wood-free sheet to obtain a high-quality output by color printing is used for a color image-containing page, and plain paper is used for a monochrome image page.

Printing apparatuses having a job hold function have also made their debut. The job hold function is a function of holding a plurality of print jobs in a printing apparatus temporarily or permanently, selecting a print job of the user's choice from the held print jobs later, and printing it. When a plurality of print jobs are selected and printed them at once, a succeeding print job can be executed at the same time as the end of a preceding print job, saving the time taken for an interaction between print jobs. This can increase the availability of the printing apparatus and the productivity when creating a printed material by the printing apparatus (see Japanese Patent Laid-Open No. 2011-9980).

A printing apparatus capable of printing using various types of sheets can obtain a complicated printed material by combining various types of sheets. However, the following case is conceivable when the user further selects a plurality of complicated print jobs each using a combination of types of sheets and issues a print instruction. Even if the printing apparatus is equipped with a plurality of sheet feed units, sheets of a plurality of types to be used by the selected print jobs are not always loaded in the sheet feed units at the start of printing without exception. If printing starts while a sheet to be used by the print job is not loaded in any sheet feed unit, the printing apparatus displays an error such as the absence of the sheet in the stage of feeding the sheet, and interrupts the print process. If the user loads the sheet to be used by the print job in a sheet feed unit, the printing apparatus can restart the print process. However, after the user selects a plurality of print jobs and issues a print instruction of them at once, the user may move away from the printing apparatus and perform another process. In such a case, the user does not notice the interruption of the print process owing to the absence of the sheet or the like. If such a situation occurs, the unwanted stop time of the printing apparatus becomes longer, and another user may be bothered.

If the user stands next to the printing apparatus awaiting the occurrence of the absence of a sheet error to prevent the above-mentioned situation before it happens, the printing apparatus interrupting printing for a long time can be avoided. However, this is not preferable in essence in terms of productivity of the printing apparatus and user friendliness.

SUMMARY OF THE INVENTION

An aspect of the present invention is to eliminate the above-mentioned problems with conventional technology.

A feature of the present invention is to provide a technique of notifying whether attribution information of a sheet used by a job is not registered in relation to a sheet storage unit and whether a sheet exists in a sheet storage unit to be used by the job.

According to an aspect of the present invention, there is provided a printing apparatus comprising: a holding unit configured to hold a job; a determination unit configured to determine whether attribution information of a sheet to be used by the job held in the holding unit is registered for a sheet storage unit; a judgment unit configured to judge whether a sheet exists in a sheet storage unit to be used by the job; and a notification unit configured to notify a result of the determination by the determination unit and a result of the judgment by the judgment unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 depicts a view illustrating an example of a sheet management table which manages information of a sheet loaded in each sheet feeding unit in the digital printing apparatus according to the first embodiment;

FIGS. 9A to 9C depict views illustrating examples of information of sheets to be used by Job A, Job D, and Job E shown in FIG. 7;

FIG. 10 depicts a view illustrating an example of an operation screen of a job hold function displayed on the console unit in the digital printing apparatus according to the first embodiment;

FIG. 11 depicts a view illustrating an example of a job hold function operation screen displayed on the console unit in the digital printing apparatus according to the first embodiment;

FIG. 12 depicts a view illustrating an example of a sheet management table which manages information of a sheet loaded in each sheet feeding unit in the digital printing apparatus according to the first embodiment;

FIGS. 14A and 14B are flowcharts for describing details of a mismatch check process (step S1307) upon pressing a mismatch check button according to the first embodiment;

FIG. 15 depicts a view illustrating an example of an operation screen of a job hold function displayed on a console unit in a digital printing apparatus according to a second embodiment of the present invention;

FIGS. 16A and 16B are flowcharts for describing details of a mismatch check process (step S1307) upon pressing a mismatch check button according to the second embodiment;

FIG. 17 depicts a view illustrating an example of an operation screen of a job hold function displayed on a console unit in a digital printing apparatus according to a third embodiment;

FIG. 21 depicts a view illustrating an example of a hold job list displayed on a UI in the printing apparatus according to the fifth embodiment;

FIG. 22 depicts a view illustrating an example of a sheet substitution screen displayed on the UI in the printing apparatus according to the fifth embodiment;

FIGS. 23A and 23B are flowcharts for describing a process of displaying a job list screen by the controller in the printing apparatus according to the fifth embodiment;

FIGS. 27A and 27B are flowcharts for describing a process of displaying a job list screen by a controller in a printing apparatus according to a sixth embodiment of the present invention; and FIGS. 28A and 28B are flowcharts for describing a process of determining the presence/absence of a medium mismatch for each sheet by a controller in a printing apparatus according to a seventh embodiment of the present invention.

DESCRIPTION OF THE EMBODIMENTS

Embodiments of the present invention will now be described hereinafter in detail, with reference to the accompanying drawings. It is to be understood that the following embodiments is not intended to limit the claims of the present invention, and that not all of the combinations of the aspects that are described according to the following embodiments are necessarily required with respect to the means to solve the problems according to the present invention.

Figure 1:
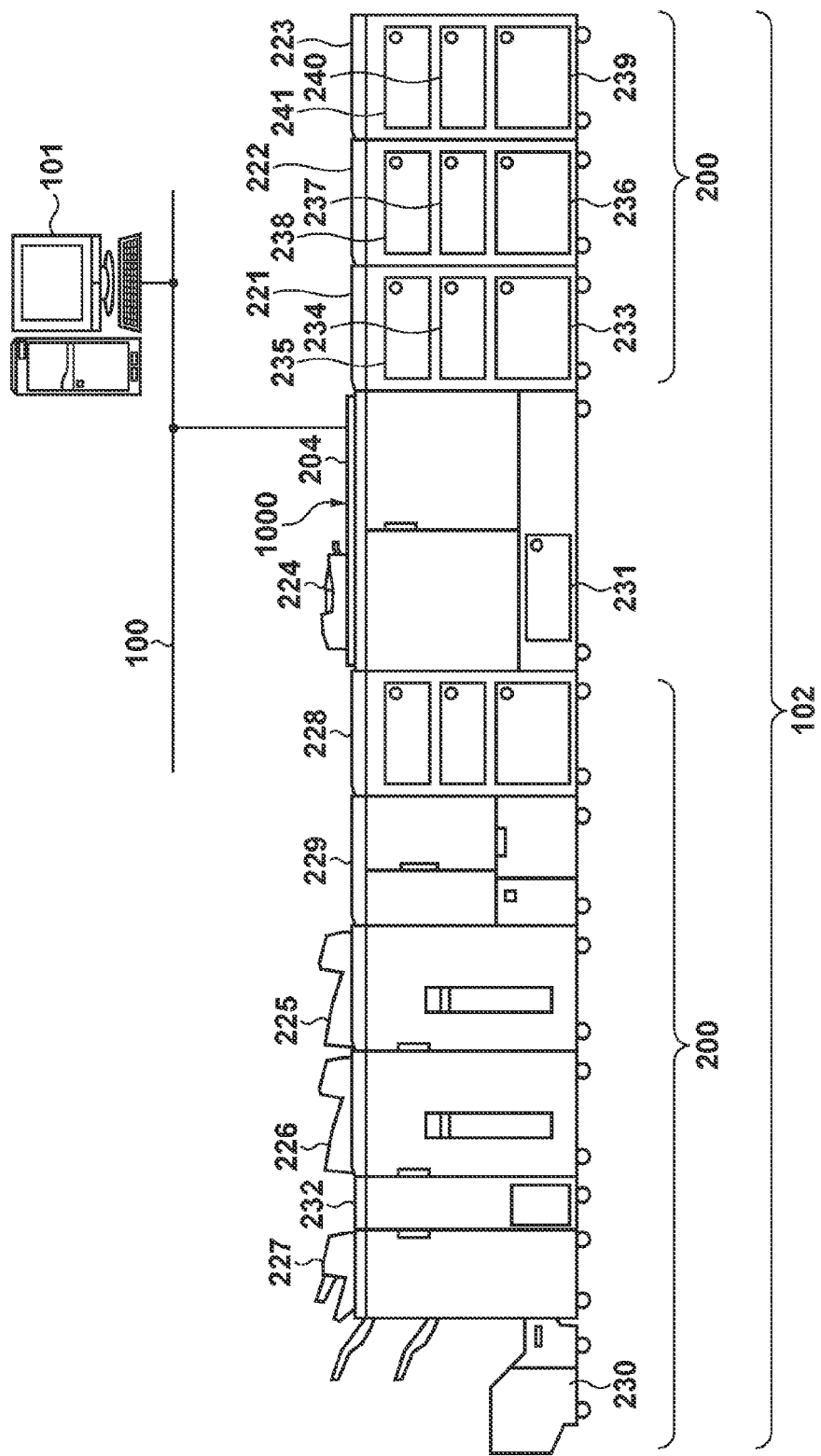
FIG. 1 depicts a view for explaining a digital printing system according to a first embodiment of the present invention.

FIG. 1 depicts a view for explaining a digital printing system according to the first embodiment of the present invention. In this printing system, a digital printing apparatus 102 and computer 101 are connected via a network 100.

The digital printing apparatus 102 is configured by coupling a plurality of apparatuses having different functions to enable a complicated sheet process. Respective parts forming the digital printing apparatus 102 will be explained.

A printer 1000 forms (prints) an image on a sheet fed from a sheet feed unit by using toner based on image data. The arrangement and operation principle of the printer 1000 are as follows.

A beam, such as a laser beam, modulated in accordance with image data is reflected by a rotating polyhedral mirror (polygonal mirror) and irradiates a photosensitive drum as scan light. An electrostatic latent image formed on the photosensitive drum by the laser beam is developed with toner, and the toner image is transferred to a sheet held by a transfer drum. The series of image formation processes is sequentially executed for yellow (Y), magenta (M), cyan (C), and black (K) toners, forming a full-color image on the sheet. The printer 1000 may be configured to be able to apply a so-called spot color toner, a transparent toner, and the like, in addition to these four colors. The sheet bearing the full-color image on the transfer drum is conveyed to a fixing unit. The fixing unit includes a roller and belt, and the roller incorporates a heat source such as a halogen heater. The fixing unit dissolves, by heat and pressure, the toner on the sheet on which the toner image is transferred, and fixes it to the sheet.

The printer 1000 of the digital printing apparatus 102 according to the first embodiment includes a scanner 224, and a console unit 204 (FIG. 4) arranged on the top of the printer 1000. The console unit 204 is arranged at the top of the printer 1000 and thus is not illustrated in FIG. 1. The console unit 204 provides various interfaces used when the user performs various settings, operations, and the like for the printer 1000 according to the first embodiment.

Further, the digital printing apparatus 102 is configured to be able to mount various optional apparatuses, in addition to the printer 1000.

Large-volume sheet feeders 221, 222, and 223 are sheet feeders dismountable from the printer 1000. These sheet feeders include a plurality of sheet feed units 233 to 241. With this arrangement, the printer 1000 can perform the print process for a large volume of sheets.

Large-volume stackers 225 and 226 are apparatuses for stocking printed sheets. In a system including the above-mentioned large-volume sheet feeders, the volume of generated printed materials also becomes large, so the large-volume stackers are required. Note that the numbers of large-volume stackers and large-volume sheet feeders are not limited to those in the arrangement of FIG. 1.

The large-volume stackers 225 and 226 can open outer lids in accordance with an instruction operation by the user to take out sheets stacked on inner stacking trays. In addition, the large-volume stackers 225 and 226 can automatically open the outer lids in accordance with an instruction from the printer 1000. When executing the outer lid opening process, it is controlled to stop in advance the stacking process of printed sheets on the large-volume stackers 225 and 226.

The large-volume stackers 225 and 226 have a shift discharge function of shifting the stacking position of an arbitrary sheet when stacking printed sheets. Thus, a large volume of stacked sheets can be sorted into predetermined bundles. A folding unit 232 is an apparatus for executing various folding processes such as center folding, Z-folding, three-folding, and quarto for sheets. A saddle stitching apparatus 227 includes various units for performing a staple process for sheets printed by the printer 1000, and saddle stitching, saddle folding, punch process, shift discharge process, and the like when creating a bound output material. When creating a saddle-stitched output material by using the saddle stitching apparatus 227, the digital printing apparatus 102 according to the first embodiment combines the saddle folding function and saddle stitching function of the saddle stitching apparatus, and forms an output material without using the folding function of the folding unit 232.

A trimmer 230 is an apparatus for conveying a bound output material saddle-stitched by the saddle stitching apparatus 227, and trimming portions corresponding to fore edges to make the fore edges flat. An inserter 228 inserts a sheet held by the inserter 228 into sheets conveyed from the printer 1000 at an appropriate timing based on settings. The inserter 228 can insert a sheet requiring no printing into printed sheets. The inserter 228 has a plurality of large-capacity sheet feeding portions to cope with a large-capacity print process, similar to the large-volume sheet feeders 221, 222, and 223. A case binding apparatus 229 is an apparatus for gluing a front cover to a bundle of sheets printed by the printer 1000 or discharged from the inserter 228, thereby forming a case-bound output material. The case binding apparatus 229 can also execute a pad binding process corresponding to a work process of performing glue binding without adding a front cover.

The digital printing apparatus 102 can be divided into roughly three parts at the boundaries of the printer 1000. In FIG. 1, devices arranged on the right side of the printer 1000 are called sheet feeding apparatuses. The main role of the sheet feeding apparatuses is to successively supply sheets loaded in them to the printer 1000 at appropriate timings. These apparatuses also, for example, detect the remaining amount of sheets loaded in them. A sheet feed unit 231 exists even in the printer 1000 and can execute the same function as that of the sheet feeders 221 to 223. In the following description, the sheet feed unit of the printer 1000 will also be called a sheet feed unit.

In FIG. 1, devices arranged on the left side of the printer 1000 are called sheet work apparatuses, sheet processing apparatuses, or post-processing apparatuses. The sheet work apparatuses perform a process of, for example, applying various work processes to sheets having undergone the print process or gathering the sheets. In the following description, the above-mentioned sheet feeding apparatuses and the sheet work apparatuses will be called sheet processing apparatuses 200.

The computer 101 is a general-purpose computer (PC) connected to the digital printing apparatus 102 via the network 100. The computer 101 can execute various application programs and transmit a print job to the digital printing apparatus 102.

Next, the arrangement (mainly software arrangement) of the digital printing apparatus 102 according to the first embodiment will be explained.

Figure 2:
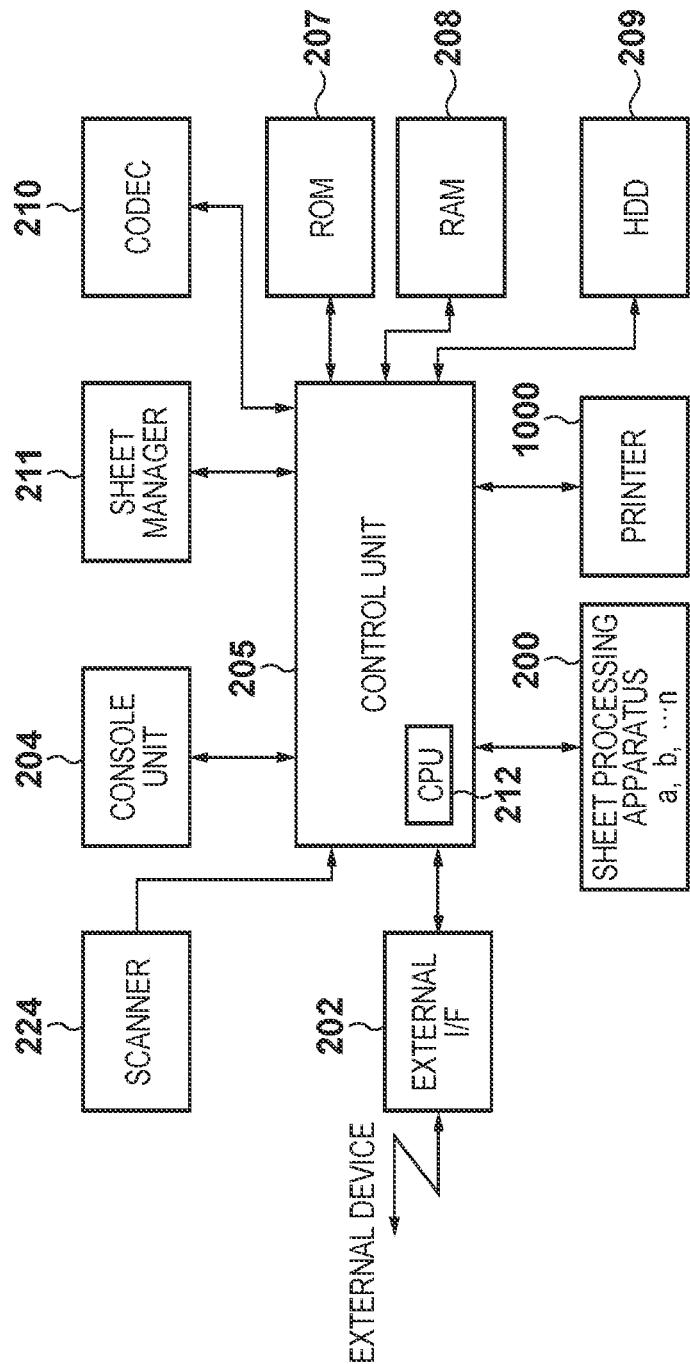
FIG. 2 is a functional block diagram showing the functional arrangement of the digital printing apparatus according to the first embodiment.

FIG. 2 is a functional block diagram showing the functional arrangement of the digital printing apparatus 102 according to the first embodiment. Note that blocks shown in FIG. 2 are divided by the unit of the system, and some portions do not always correspond to those divided by the unit of the device arrangement shown in FIG. 1.

The digital printing apparatus 102 incorporates a nonvolatile memory such as a hard disk (to be referred to as an HDD hereinafter) 209 capable of storing data of a job to undergo a plurality of processes. Although the first embodiment exemplifies the digital printing apparatus 102 using a hard disk, the storage is not limited to a hard disk as long as it is a similar large-capacity, nonvolatile storage.

The digital printing apparatus 102 has a copy function of storing data accepted from the scanner 224 in the HDD 209, reading it out from the HDD 209, and printing it by the printer 1000. Also, the digital printing apparatus 102 has, for example, a print function of storing, in the HDD 209, job data received from an external apparatus via an external I/F 202 serving as an example of a communication unit, reading out the job data from the HDD 209, and printing it by the printer 1000. The digital printing apparatus 102 is an MFP (Multi-Function Peripheral: also called an image forming apparatus) having a plurality of functions. The digital printing apparatus 102 is arbitrarily capable of color printing or monochrome printing.

The scanner 224 reads an original image, performs an image process for image data obtained by reading the original, and outputs the processed data. The external I/F 202 transmits/receives image data and the like to/from a facsimile apparatus, network connection device, or external dedicated apparatus. The HDD 209 stores various types of management information which are permanently stored, changed, and managed by the digital printing apparatus 102. The digital printing apparatus 102 includes the printer 1000 which executes the print process for data of a target print job stored in the HDD 209. The digital printing apparatus 102 also includes the console unit 204 which has a display and is an example of a user interface. A control unit 205 serving as an example of the control unit of the digital printing apparatus 102 includes a CPU 212, and performs centralized control of the processes, operations, and the like of various units of the digital printing apparatus 102. A ROM 207 stores various control programs necessary in the first embodiment, including programs to be executed by the CPU 212 to execute various processes of flowcharts to be described later and the like. The ROM 207 also stores display control programs for displaying various UI screens on the display of the console unit 204, including a user interface screen (to be referred to as a UI screen hereinafter).

The CPU 212 of the control unit 205 reads out and executes a program stored in the ROM 207, causing the digital printing apparatus 102 to execute various operations according to the first embodiment. The ROM 207 also stores, for example, a program for causing the CPU 212 to execute an operation of interpreting data of a page description language (to be abbreviated as PDL hereinafter) received from an external apparatus via the external I/F 202, and rasterizing the data into raster image data (bitmap image data). Similarly, the ROM 207 stores, for example, a program for causing the CPU 212 to interpret and process a print job received from an external apparatus via the external I/F 202. These programs are processed by software. The ROM 207 is a read-only memory, and stores in advance programs such as a boot sequence and font information, and various programs such as the above-described programs. Details of various programs stored in the ROM 207 will be described later. A RAM 208 is a readable/writable memory, and stores image data sent from the scanner 224 and external I/F 202, various programs, setting information, and the like.

The HDD 209 stores image data compressed by a codec 210. The HDD 209 is configured to be able to hold a plurality of data items of such as print data of a job to be processed. The control unit 205 stores, in the HDD 209, data of jobs to be processed that are input via various input units such as the scanner 224 and external I/F 202, reads out the data from the HDD 209, and outputs them to the printer 1000 to print. The control unit 205 controls to transmit job data read out from the HDD 209 to an external apparatus via the external I/F 202. In this manner, the control unit 205 executes various output processes for data of a job to be processed that is stored in the HDD 209. The codec 210 compresses or decompresses image data and the like stored in the RAM 208 and HDD 209 in accordance with various compression methods such as JBIG and JPEG.

The control unit 205 also controls the operations of the sheet processing apparatuses 200. The sheet processing apparatuses 200 are equivalent to the sheet feeding apparatuses and sheet work apparatuses described with reference to FIG. 1. A sheet manager 211 is a module for managing information about, for example, the type of sheet processable by the digital printing apparatus 102.

Figure 3:
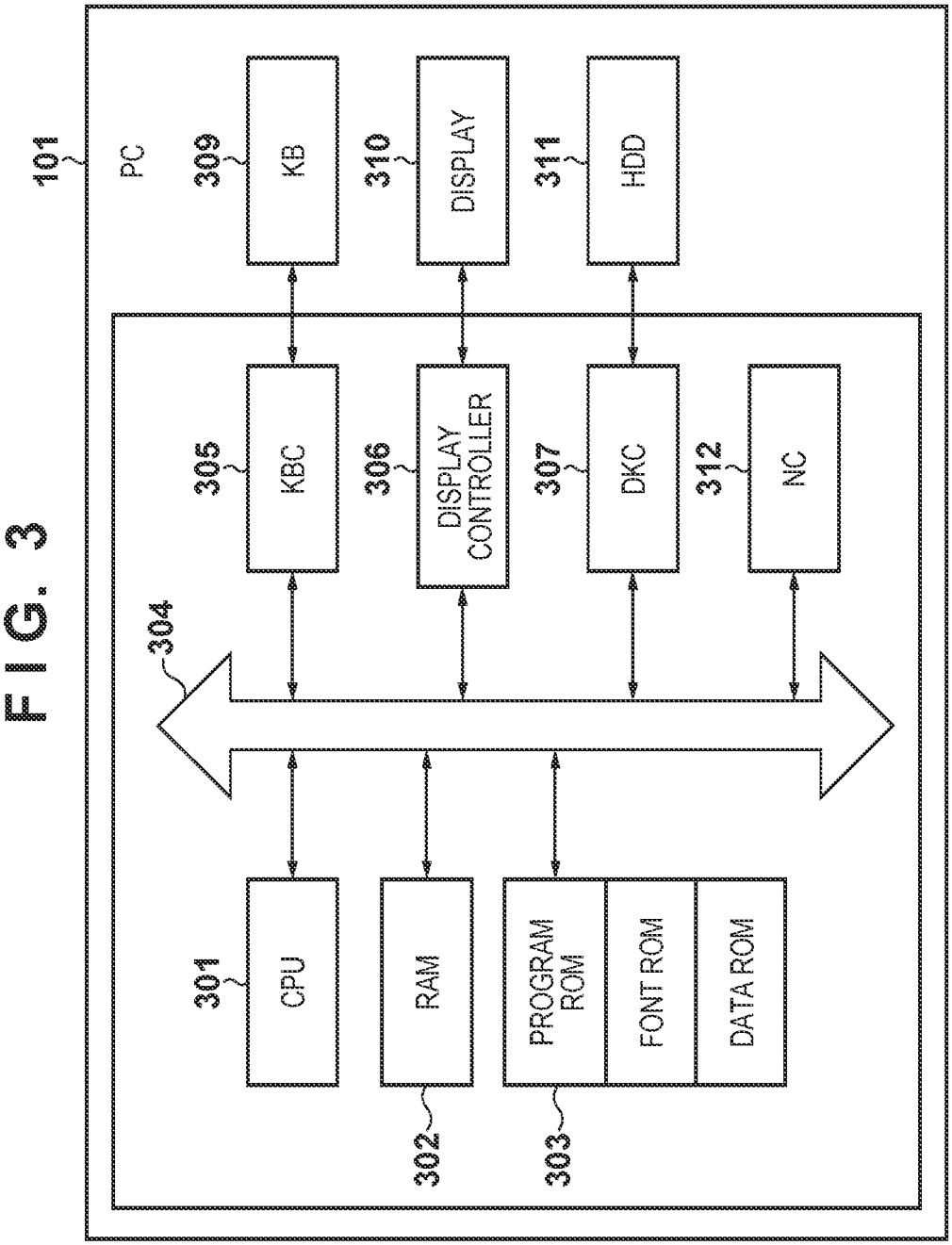
FIG. 3 is a block diagram showing the arrangement of a computer (PC) according to the first embodiment.

FIG. 3 is a block diagram showing the arrangement of the computer (PC) 101 according to the first embodiment.

In FIG. 3, a CPU 301 executes programs such as an OS, general application, and bookbinding application which are stored in the program ROM of a ROM 303 or loaded from an HDD 311 into a RAM 302. The ROM 303 also includes a font ROM and data ROM. The RAM 302 functions as a main memory, work area, and the like for the CPU 301. A keyboard controller (KBC) 305 controls inputs from a keyboard 309 and a pointing device (not shown). A display controller 306 controls display on a display 310. A disk controller (DKC) 307 controls access to, for example, the HDD 311 which stores a boot program, various applications, font data, user files, and the like. A network controller (NC) 312 is connected to the network 100 and executes a communication control process with another device connected to the network 100. A bus 304 connects the CPU 301, RAM 302, ROM 303, various controllers, and the like, and transmits data signals and control signals.

Figure 4:
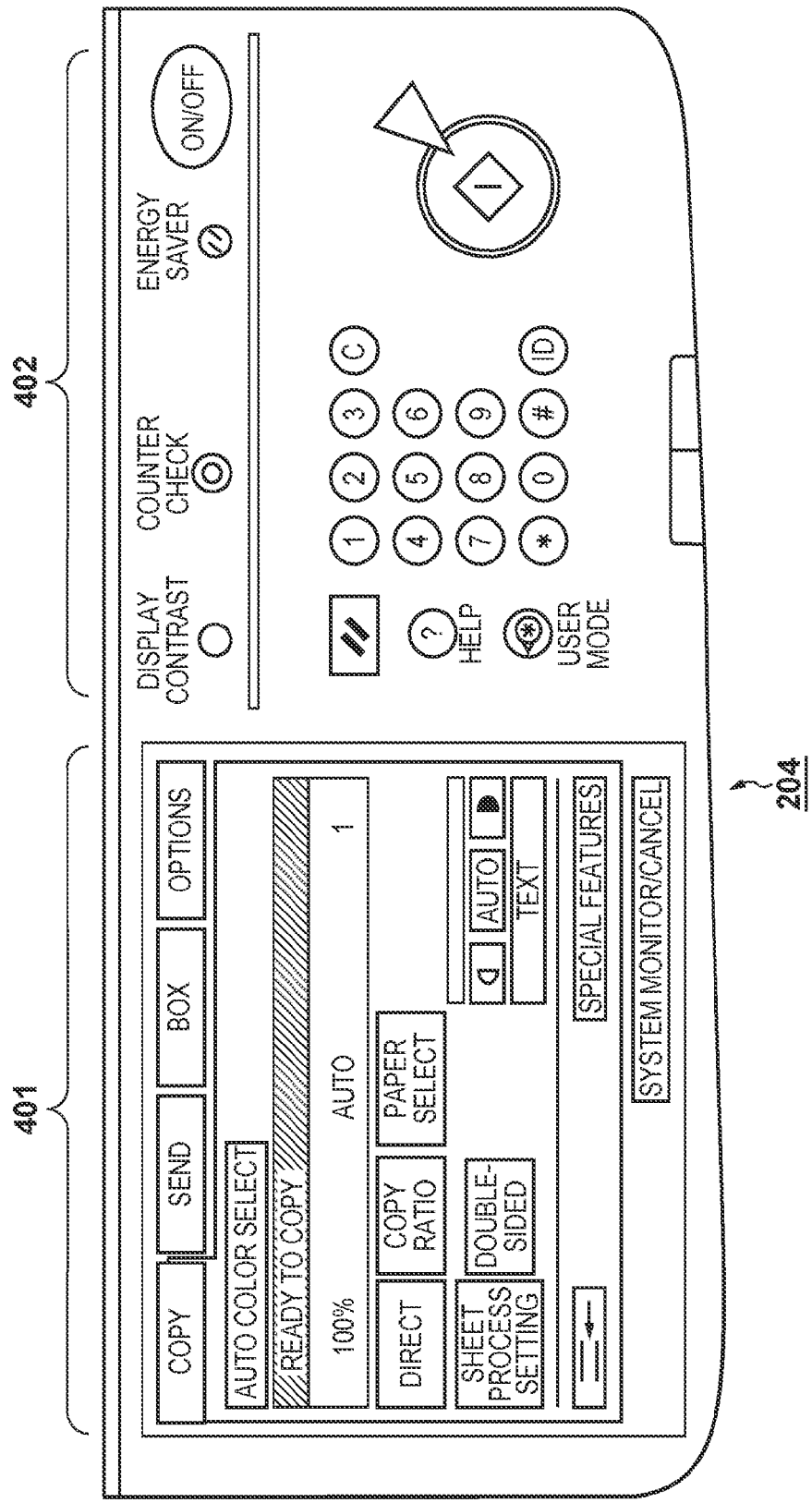
FIG. 4 depicts a plan view showing the console unit of the digital printing apparatus according to the first embodiment.

FIG. 4 depicts a plan view showing the console unit 204 of the digital printing apparatus 102 according to the first embodiment.

The console unit 204 includes a key input portion 402 capable of accepting a user operation with a hard key, and a touch panel 401 serving as an example of a display unit capable of accepting a user operation with a soft key (display key). A screen displayed on the display of the touch panel 401 shown in FIG. 4 is an example of an operation screen displayed under the control of the control unit 205. Items to be displayed on the display or operable on the display change in accordance with an operation to this screen by the user, or various states of the devices.

Figure 5:
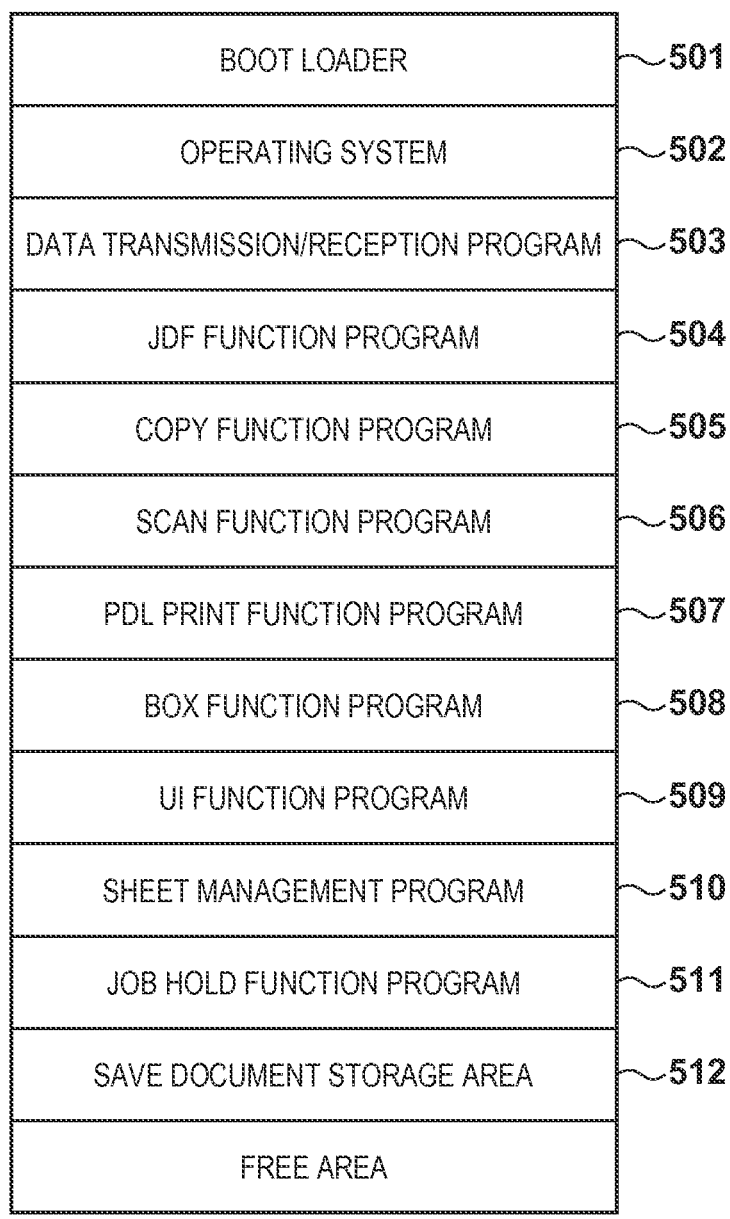
FIG. 5 depicts a view for explaining the programs of the digital printing apparatus according to the first embodiment.

FIG. 5 depicts a view for explaining the programs of the digital printing apparatus according to the first embodiment.

These programs are stored in the ROM 207, read out by the CPU 212 of the control unit 205 of the digital printing apparatus 102, and executed.

A boot loader 501 is a program to be executed immediately after power-on of the digital printing apparatus 102. These programs include programs for executing various activation sequences necessary to activate the system. An operating system 502 is a program aiming to provide the execution environment of various programs for implementing the functions of the digital printing apparatus 102. The operating system 502 mainly provides functions such as resource management of the memory of the digital printing apparatus 102, that is, the ROM 207, RAM 208, HDD 209, and the like, and basic input/output control of the respective units shown in FIG. 2. A data transmission/reception program 503 performs a transmission/reception process to be performed when a data input/output request is generated via the external I/F 202. More specifically, the data transmission/reception program 503 contains the TCP/IP protocol stack or the like, and controls communication of various data exchanged with an external device or the like connected via the network 100. This communication process is a process specialized in the transmission/reception level of data packets and a communication process by an HTTP server or the like, and does not include an analysis process regarding the contents of received data (to be described later). The control unit 205 executes the data analysis process based on the description contents of another program.

A JDF (Job Definition Format) function program 504 is a program of executing the JDF print function by the control unit 205 in accordance with an instruction from the external I/F 202 when the digital printing apparatus 102 receives JDF job data via the external I/F 202. With the JDF print function, the control unit 205 sequentially designates the operations of respective devices in an appropriate order based on a process order and process conditions described in the program. As a result, it is controlled to finally execute the JDF print process. The respective devices include the sheet processing apparatus 200, printer 1000, HDD 209, codec 210, and RAM 208. The JDF function program 504 also includes programs for performing an analysis process for JDF job data received via the external I/F 202, performing a discrimination process of whether the JDF contains an improper setting as a result of the analysis process, and performing setting change or the like to cancel the improper setting.

A copy function program 505 is a program for executing the copy function by the control unit 205 in accordance with an instruction from the console unit 204 when the user of the digital printing apparatus 102 designates execution of the copy function from the console unit 204. With the copy function executed by the control unit 205, the control unit 205 sequentially designates the resources of the digital printing apparatus 102 and the operations of respective devices in an appropriate order based on a process order and process conditions described in the program. It is therefore controlled to finally execute the copy process. The respective devices include the scanner 224, printer 1000, sheet processing apparatus 200, HDD 209, codec 210, and RAM 208.

A scan function program 506 is a program for executing the scan function by the control unit 205 in accordance with an instruction from the console unit 204 when the user of the digital printing apparatus 102 designates execution of the scan function from the console unit 204. The control unit 205 controls modules such as the scanner 224, HDD 209, codec 210, and RAM 208 in accordance with a process order and process conditions described in the program. At this time, by sequentially designating the operations of the respective devices in an appropriate order, it is controlled to finally execute the scan process.

A PDL (Page Description Language) function program 507 executes the PDL print function by the control unit 205 when the digital printing apparatus 102 receives PDL data (print job data) via the external I/F 202. With the PDL print function executed by the control unit 205, the control unit 205 sequentially designates the operations of respective devices in an appropriate order based on a process order and process conditions described in the program. As a result, it is controlled to finally execute the PDL print process. The respective devices include the sheet processing apparatus 200, printer 1000, HDD 209, codec 210, and RAM 208.

A BOX function program 508 executes the BOX function by the control unit 205 in accordance with an instruction from the console unit 204 when the user of the digital printing apparatus 102 designates execution of the BOX function from the console unit 204. With the BOX function, the control unit 205 executes the BOX process by sequentially designating the operations of respective devices in an appropriate order based on a process order and process conditions described in the program. The respective devices include the scanner 224, printer 1000, sheet processing apparatus 200, HDD 209, codec 210, and RAM 208. The settings, at the time of storage, of the job of job data stored in the HDD 209 by this BOX function can be changed to execute the job.

A UI (User Interface) function program 509 is a control program for the console unit 204. The UI function program 509 identifies contents input from the console unit 204 by the user of the digital printing apparatus 102, performs an appropriate screen transition, and issues a process request instruction to the control unit 205.

A sheet management program 510 is a program for executing the management function regarding sheets available in the digital printing apparatus 102. Sheet-related information managed by this program is stored in the HDD 209.

A job hold function program 511 is a program to be executed by the control unit 205 when the user of the digital printing apparatus 102 designates execution of the job hold function from the console unit 204. The job hold function is a function of storing data to be printed in the HDD 209 of the digital printing apparatus 102 until the user issues a print instruction, and then printing in accordance with data for which the print instruction has been accepted from the user. With the job hold function, the control unit 205 executes the job hold print process by sequentially designating the operations of respective devices in an appropriate order based on a process order and process conditions described in the program. These devices include the printer 1000, sheet processing apparatus 200, HDD 209, codec 210, and RAM 208. The settings of stored job data at the time of storage can be changed to execute the job.

Print job data is stored from the computer 101 serving as an external device for the job hold function of the digital printing apparatus 102 according to the following procedures. More specifically, storage by the job hold function is designated instead of performing the print process for job data in accordance with the PDL function program 507, JDF function program 504, or the like. Which of the PDL function program 507 and JDF function program 504 issues a print instruction or performs the storage process to the job hold function is determined by designation of a print application running on the computer 101 serving as a job input destination. This designation is reflected in the setting attribute of job data to be processed by the PDL function program 507, JDF function program 504, or the like. The PDL function program 507 or JDF function program 504 switches the process based on the setting attribute.

Note that the digital printing apparatus need not include all the function programs shown in FIG. 5, but may include some of them or a function program other than the above-described ones.

A save document storage area 512 is a save job data storage area managed by the job hold function program 511. Job data to be saved that has been received from an external apparatus is stored in the save document storage area 512 together with print settings.

Figure 6:
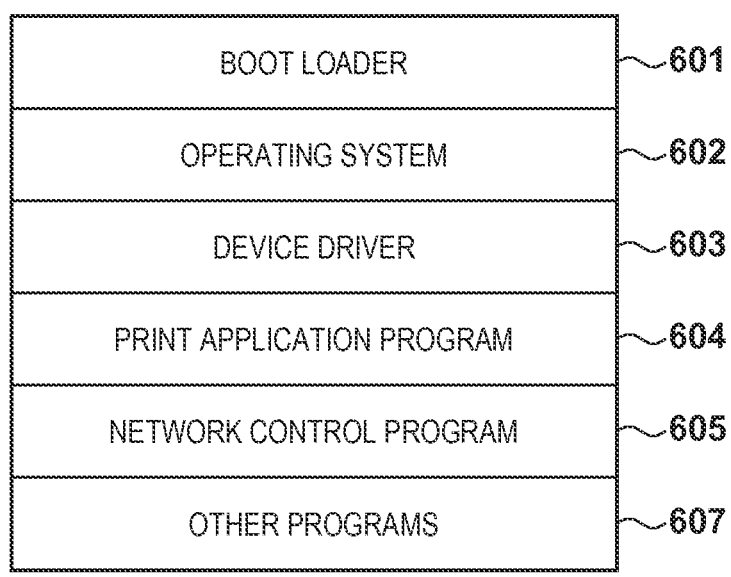
FIG. 6 depicts a view exemplifying the structure of programs in the computer according to the first embodiment.

FIG. 6 depicts a view exemplifying the structure of programs in the computer 101 according to the first embodiment.

The operations of a boot loader 601 and operating system 602 are the same those of the boot loader 501 and operating system 502 in FIG. 5, and a description thereof will not be repeated. A device driver 603 is a program for controlling various hardware units connected to the computer 101. The device driver 603 includes programs for controlling the KBC 305, display controller 306, DKC 307, and the like. A print application program 604 is a general term of programs which run on the computer 101 and aim to provide various functions and services to the user of the printing system. The print application program 604 has a function of creating or editing data of a print job. The print application program 604 also has a function of converting various print specifications set from the setting screen (not shown) of the application program 604 into corresponding print settings.

The print application program 604 can also reversely convert settings included in print settings into internal information necessary to control display items on a corresponding setting screen of the print application program 604. Further, the print application program 604 has a function of selecting a print setting file saved in the HDD 311 and creating print job data. The print application program 604 has an ability to convert print settings into a PDL command format or JDF format, and compositing them with data to be printed, thereby creating print job data.

A network control program 605 is a program to be executed when print job data created by the print application program 604 is transmitted to the digital printing apparatus 102 connected via the network 100. The program 605 can be configured to have a function of, for example, transmitting print data, and after the transmission, acquiring progress information of a print job executed by the digital printing apparatus 102. Other programs 607 include programs other than the above-described ones, and a detailed description thereof will be omitted.

Figure 7:
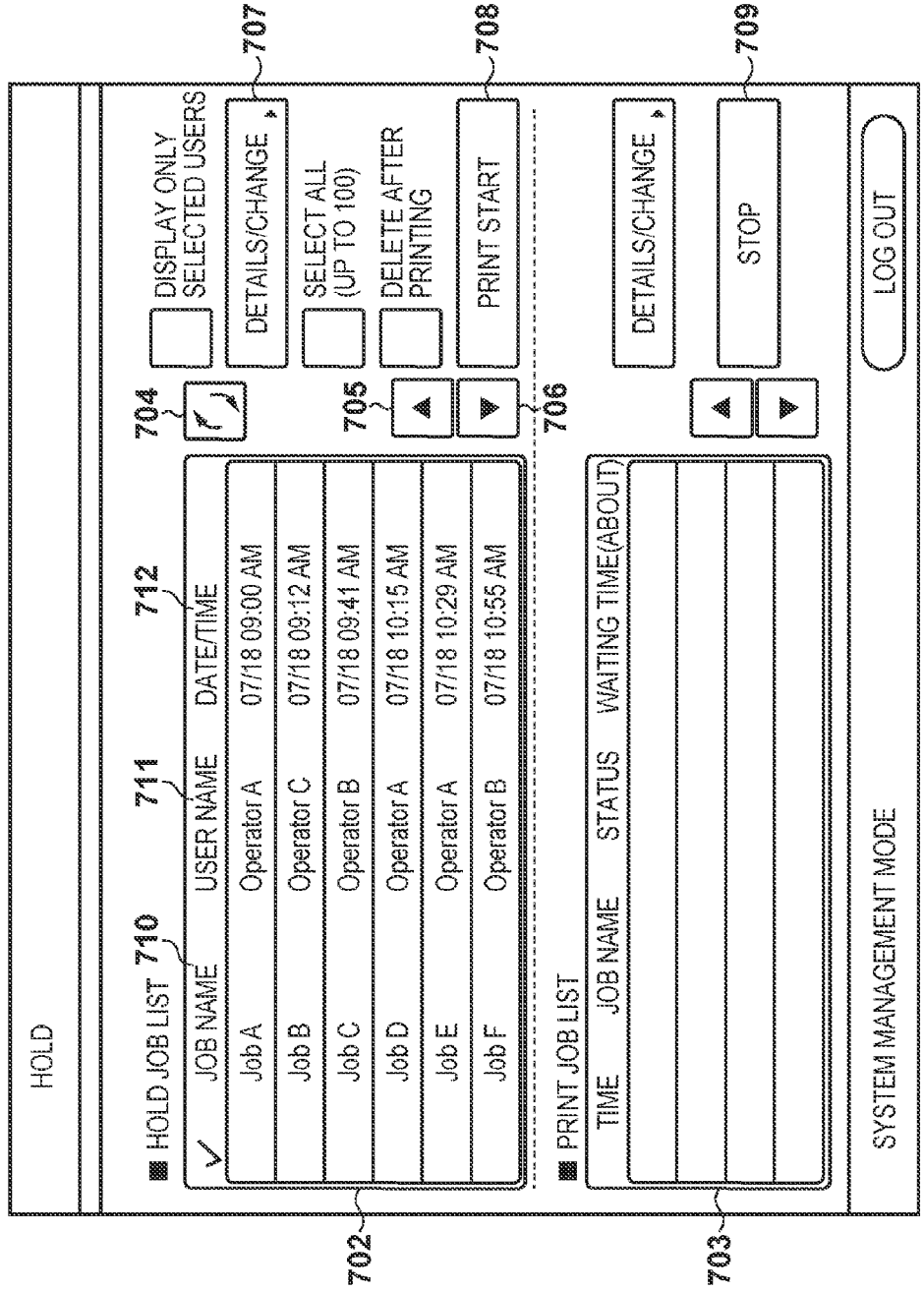
FIG. 7 depicts a view illustrating an example of an operation screen of a job hold function displayed on the console unit in the digital printing apparatus according to the first embodiment.

FIG. 7 depicts a view illustrating an example of an operation screen of a job hold function displayed on the console unit 204 in the digital printing apparatus 102 according to the first embodiment. This job hold screen includes a plurality of display areas and a plurality of operation buttons. An important point in the description of the first embodiment will be explained. The job hold function is a function of storing data to be printed in the HDD 209 of the digital printing apparatus 102 until the user issues a print instruction, and then printing in accordance with data for which the print instruction has been accepted from the user. With the job hold function, the digital printing apparatus 102 can store a plurality of data items in the HDD 209.

A job hold list 702 is a region where a list of print job data saved in the save document storage area 512 of the digital printing apparatus 102 is displayed. In the example of FIG. 7, six print job data items are displayed. Note that the digital printing apparatus 102 can store a larger number of print jobs in the HDD 209 than the number of print jobs simultaneously displayable in the job hold list 702. For example, when seven or more print jobs are stored, the user can sequentially display all the stored print jobs in the job hold list 702 by pressing scroll buttons 705 and 706. For each print job displayed in the job hold list 702, a job name 710, a user name 711 of a user who saved this job, and a date/time field 712 indicating the date and time when the print job was saved in the digital printing apparatus 102 are displayed.

A user who operates this job hold screen is assumed to select a job to be printed based on these pieces of information.

Assume that a user who operates the job hold screen in the job hold function of the digital printing apparatus 102 is "Operator A". Among a plurality of jobs displayed in the job hold list 702 in FIG. 7, there are three jobs having the user name "Operator A", that is, jobs "Job A", "Job D", and "Job E".

In some use cases, a user who operates the digital printing apparatus 102 selects and prints a print job of a user not matching the user name of this user. However, in most use cases, the user selects and prints his or her print job as a target print job. For this reason, a case in which the user selects and prints the user's print job will be exemplified. However, the present invention is applicable to even a case in which the user selects and prints a print job which is not the user's print job.

When the user presses a print job portion displayed in the job hold list 702 with his finger or the like, the print job is selected as a target print job. The print job selection process will be explained in detail with reference to subsequent drawings.

A print job list 703 displays a list of print jobs for which the digital printing apparatus 102 has started the print process. In the example of FIG. 7, there is no print job for which the print process has started. That is, the printer 1000 of the digital printing apparatus 102 is idle.

A print start button 708 is a button for designating the start of the print process for a print job selected from the job hold list 702. A stop button 709 is a button for stopping execution of a print job for which the print process has started with the print start button 708.

A mismatch check button 704 is a button for designating a collation process between information of a sheet to be used by a print job selected from the job hold list 702, and a sheet loaded in the digital printing apparatus 102. In this collation process, it is determined whether a sheet to be used by a print job stored in the HDD 209 has not been loaded in any sheet feed unit of the digital printing apparatus 102. For example, assume that print job P has a setting of using only "sheet A". Also, assume that "sheet A" is set for the sheet feed unit of the digital printing apparatus 102 and loaded (case 1). If the user presses the mismatch check button 704 in this state, it is determined as the result of collation that "sheet A" to be used by print job P is available.

As another example, assume that print job P has a setting of using only "sheet A", "sheet A" is set for the sheet feed unit of the digital printing apparatus 102, but the remaining amount of sheets of "sheet A" in this sheet feed unit is 0 (case 2). If the user presses the mismatch check button 704 in this state, it is determined as the result of collation that "sheet A" to be used by selected print job P is prepared to be available but the remaining amount of sheets of "sheet A" is 0. As a solution in this case, the user supplies "sheet A" in the sheet feed unit.

As still another example, assume that selected print job P has a setting of using only "sheet A", and "sheet A" is not set for any sheet feed unit of the digital printing apparatus 102 (case 3). If the user presses the mismatch check button 704 in this state, it is determined as the result of collation that "sheet A" to be used by selected print job P is not available. As a solution in this case, the user sets "sheet A" as setting information for a sheet feed unit and supplies "sheet A" in the sheet feed unit.

In case 2 and case 3 described above, if the user presses the print start button 708 while selecting a print job, an unprepared sheet is to be fed. At this stage, a paper out error is generated, and the print process stops, decreasing the productivity in the digital printing apparatus 102.

To the contrary, according to the first embodiment, the function provided by the mismatch check button 704 allows the user to confirm, before pressing the print start button 708, whether a sheet to be used by a selected print job is usable in the digital printing apparatus 102. This is because the print process can be started after the user sets or supplies sheets based on the result of a check with the mismatch check button 704. Accordingly, the user can prepare sheets before the start of a print job, and can reduce the risk of a decrease in productivity caused by interruption of the print process by the digital printing apparatus upon generation of a paper out error after the start of executing the print job.

A details/change button 707 is a button for changing the screen to a screen to confirm details of a print job selected in the job hold list 702 or change print specifications.

FIG. 8 depicts a view illustrating an example of a sheet management table which manages information of a sheet loaded in each sheet feed unit in the digital printing apparatus 102 according to the first embodiment. The sheet management table is stored in the HDD 209 and looked up by the CPU 212.

In an example shown in FIG. 8, pieces of information of a size 812, sheet type 813, and remaining amount 814 of sheets are managed by using a sheet feed unit ID 811 as a key for each of 10 feed units of the digital printing apparatus 102.

For example, reference numeral 801 denotes that the size of a sheet loaded in a sheet feed unit (ID=1) is A4, the sheet type is plain paper 1, and the remaining amount of sheets is 3. Numerical values indicated by the remaining amount 814 of sheets have the following meanings: 3: full (100%), 2: a small number of remaining sheets (25%), 1: a very small number of remaining sheets (less than 5%), and 0: no sheet remains (0%). Note that the detection accuracy of the remaining amount of sheets can be made finer by, for example, increasing the accuracy of a remaining amount sensor. However, the digital printing apparatus 102 according to the first embodiment detects the remaining amount of sheets based on the above-described specifications.

FIGS. 9A to 9C depict view illustrating examples of information of sheets to be used by Job A, Job D, and Job E shown in FIG. 7.

This information is held by storing print settings simultaneously when the job hold function program 511 in FIG. 5 stores print job data in the save document storage area 512. Note that the print settings include information of a sheet to be used by a print job.

FIG. 9A shows that Job A uses a total of two types of sheets, that is, a sheet of size A4 and sheet type "plain paper 1" and a sheet of size A4 and sheet type "double-side coated paper 1". FIG. 9B shows that Job D uses a total of two types of sheets, that is, a sheet of size LTR and sheet type "plain paper 1" and a sheet of 11×17 size and sheet type "plain paper 1". Similarly, FIG. 9C shows that Job E uses a total of three types of sheets, that is, a sheet of size A4 and sheet type "plain paper 1", a sheet of size A4 and sheet type "colored paper (red)", and a sheet of size A3 and sheet type "double-side coated paper 2".

FIG. 10 depicts a view illustrating an example of an operation screen of a job hold function displayed on the console unit 204 in the digital printing apparatus 102 according to the first embodiment. FIG. 10 shows a display example immediately after operator A operates the job hold screen displayed on the console unit 204 and selects a print job. The same reference numerals as those in FIG. 7 denote the same parts. In this state, operator A sequentially selects Job A, Job D, and Job E, and these three jobs are selected. The selected jobs are indicated by selection marks 1001, 1002, and 1003 on the left side of the job name fields. Further, numerical values are added to the marks 1001, 1002 and 1003 to indicate the order in which the print jobs have been selected. Reference numeral 1004 denotes finally selected Job E which is highlighted. This means that this job is currently selected in the job hold list 702. If the operator presses the details/change button 707 in this state, the user can confirm detailed information of Job E and change the settings.

FIG. 11 depicts a view illustrating an example of an operation screen of a job hold function displayed on the console unit 204 in the digital printing apparatus 102 according to the first embodiment. FIG. 11 shows an example of a job hold screen displayed immediately after the operator presses the mismatch check button 704 while the job hold list 702 is in the state shown in FIG. 10. The same reference numerals as those in FIG. 10 denote the same parts, and a description thereof will not be repeated.

In FIG. 10, for each of three jobs Job A, Job D, and Job E selected by the user, a match between a sheet to be used by each print job and a sheet set for the sheet feed unit of the digital printing apparatus 102 is checked.

As for Job A, sheets to be used by the print job are set for sheet feed units, and the remaining amount is not 0, as shown in FIGS. 8 and 9A. In this case, when the user presses the print start button 708, the user can know, before designating the start of printing, that the possibility at which a paper out error will occur is very low.

As for Job D, sheets to be used by the print job are set for sheet feed units, but the remaining amount of a given type is 0, as shown in FIGS. 8 and 9B. More specifically, the remaining amount of size "11×17" and sheet type "plain paper 1" set for "feed unit 9" is 0. If the user presses the print start button 708 in this state, a paper out error occurs in the stage of feeding a sheet of size "11×17", and the print process stops. This is represented by a warning mark 1101. If the user recognizes that the warning mark 1101 has been displayed, it suffices to take a proper measure, that is, supply sheets of size "11×17" and sheet type "plain paper 1" in "feed unit 9".

As for Job E, a sheet not set for any sheet feed unit exists among sheets to be used by the print job, as shown in FIGS. 8 and 9C. More specifically, a sheet of size A3 and sheet type "double-side coated paper 2" is not set for any sheet feed unit. This is represented by a warning mark 1102. If the user presses the print start button 708 in this state, the user can know, before designating the start of printing, that a paper out error will occur in the stage of feeding the sheet and the print job will stop. If the user confirms that the warning mark 1102 has been displayed, the user takes a proper measure, that is, specifies another sheet feed unit (desirably a sheet feed unit, the use of which by a job is not decided), and changes the sheet settings of the sheet feed unit to size A3 and sheet type "double-side coated paper 2". Further, the user supplies corresponding sheets in the sheet feed unit. If originally loaded sheets remain, the user exchanges them with the corresponding sheets. The warning mark 1101 represents that a sheet to be used by a print job is set for a sheet feed unit but the remaining amount is 0. The warning mark 1102 represents that a sheet to be used by a print job is not set for any sheet feed unit. By making the shapes of the warning marks 1101 and 1102 different from each other, the user can recognize in distinction whether a sheet for a job is not set for any sheet feed unit, or whether a sheet for a job is set but the remaining amount of this type is 0.

In this fashion, when the user presses the mismatch check button 704, the warning marks 1101 and/or 1102 is displayed in correspondence with print jobs for which a paper out error will occur. The user can avoid the stop of execution of a print job after designating the start of the print job.

If the user presses the details/change button 707 in the state of FIG. 11, a sheet size and sheet type (for example, FIG. 9C) to be used by selected Job E are displayed. At this time, information of a sheet (in this case, A3 and double-side coated paper 2) not set for any sheet feed unit is, for example, highlighted and displayed, and a sheet not set for any sheet feed unit can be presented to the user.

If the user selects Job D and presses the details/change button 707 in the state of FIG. 11, a sheet size and sheet type (for example, FIG. 9B) to be used by Job D are displayed. At this time, the CPU 212 flickers sheet information for which the remaining amount is 0. Also, the CPU 212 flickers the display of a sheet feed unit for which the sheet is set. From them, the user can grasp information of a sheet of a sheet size and sheet type to be used by Job D for which the remaining amount is 0, and the sheet feed unit of the sheet. Even when a sheet size and sheet type are displayed, the display method of sheet information when a sheet is not set for any sheet feed unit, and the display method of sheet information when the remaining amount is 0 are made different from each other. The user can recognize in distinction whether a sheet of a displayed size and type is not set for any sheet feed unit, or whether the remaining amount is 0.

FIG. 12 depicts a view illustrating an example of a sheet management table which manages information of a sheet loaded in each sheet feed unit in the digital printing apparatus 102 according to the first embodiment. FIG. 12 shows the sheet management table after the user executes the avoidance process based on the screen and operation in FIG. 11. The sheet management table in FIG. 12 is also stored in the HDD 209 and looked up by the CPU 212. The same reference numerals as those in FIG. 8 denote the same parts, and a description thereof will not be repeated.

A difference from the table shown in FIG. 8 is that the sheet type of a sheet feed unit (ID=4) has been changed to "double-side coated paper 2" and sheets have been supplied (remaining amount is 3). Another difference is that sheets have been supplied to a sheet feed unit (ID=9) and the remaining smount has changed from 0 to 3.

If the user presses again the mismatch check button 704 in FIG. 11 after executing the sheet registration and supply processes to obtain the state shown in FIG. 12, the screen returns to one shown in FIG. 10. That is, the warning marks 1101 and 1102 in FIG. 11, each representing the cause of generation of a paper out error, disappear.

If the user presses again the print start button 708 in this state, the user can know, before the start of printing, that the possibility at which a paper out error will occur after the digital printing apparatus 102 starts the print process is very low. This can increase the productivity of the user and the availability of the digital printing apparatus 102. As a result, the convenience of the digital printing apparatus 102 directed to the POD market can be improved.

Figure 13:
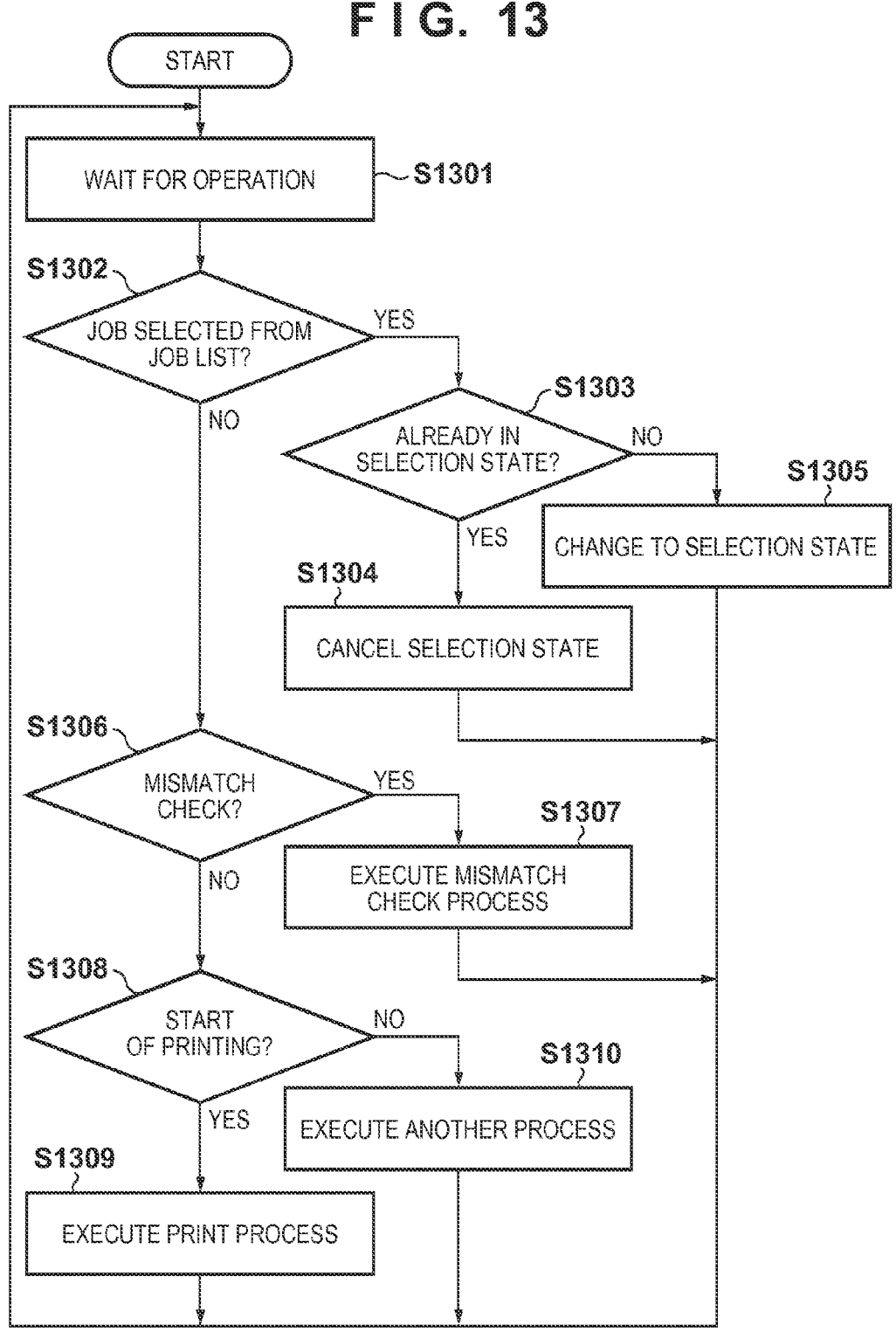
FIG. 13 is a flowchart for describing a process by the digital printing apparatus according to the first embodiment.

FIG. 13 is a flowchart for describing a process by the digital printing apparatus 102 according to the first embodiment. This process is achieved by executing, by the CPU 212 of the control unit 205, a program which is read out from the ROM 207 or HDD 209 and deployed in the RAM 208. This process starts while the display of the console unit 204 displays the screen shown in FIG. 7.

First, in step S1301, the CPU 212 waits for a user operation on the screen shown in FIG. 7 that is displayed on the console unit 204. The process stays in step S1301 until the user performs an operation. If the user executes an operation on the console unit 204, the process advances to step S1302, and the CPU 212 determines whether the operation is an operation of selecting a print job displayed in the job hold list 702. If the CPU 212 determines that the operation is an operation of selecting a print job displayed in the job hold list 702, the process advances to step S1303, and the CPU 212 determines whether the selected print job has already been in the selection state (has been already selected). If the CPU 212 determines that the selected print job has already been in the selection state, the process advances to step S1304, the CPU 212 cancels the selection state of the print job (the print job is in non-selected state), and then the process returns to step S1301. If the CPU 212 determines in step S1303 that the selected print job has not already been in the selection state, the process advances to step S1305, and the CPU 212 changes the print job to the selection state. More specifically, as shown in FIG. 10, the CPU 212 displays selected print jobs together with the mark 1001, 1002, or 1003 representing the selection state. The process then returns to step S1301.

If the CPU 212 determines in step S1302 that the operation in step S1301 is not an operation of selecting a print job displayed in the job hold list 702, the process advances to step S1306. In step S1306, the CPU 212 determines whether the user has pressed the mismatch check button 704. If the CPU 212 determines that the user has pressed the mismatch check button 704, the process advances to step S1307, the CPU 212 executes the mismatch check process, and then the process advances to step S1301. Note that the process in step S1307 will be described later with reference to the flowcharts of FIGS. 14A and 14B.

If the CPU 212 determines in step S1306 that the user has not pressed the mismatch check button 704, the process advances to step S1308, and the CPU 212 determines whether the operation in step S1301 is the pressing process of the print start button 708. If the operation in step S1301 is pressing of the print start button 708, the process advances to step S1309, and the CPU 212 executes the print process for the selected print job. After the end of the print process for all the selected print jobs, the process returns again to step S1301. If the CPU 212 determines in step S1308 that the operation in step S1301 is not pressing of the print start button 708, it determines that the operation in step S1301 does not correspond to any of the above-mentioned processes, and advances the process to step S1310. In step S1310, the CPU 212 executes a process corresponding to the operation, and after the end of the process, returns to step S1301. Details of the process in step S1310 are not important for a description of the effects of the embodiment, and a description thereof will be omitted.

Figure 14A:
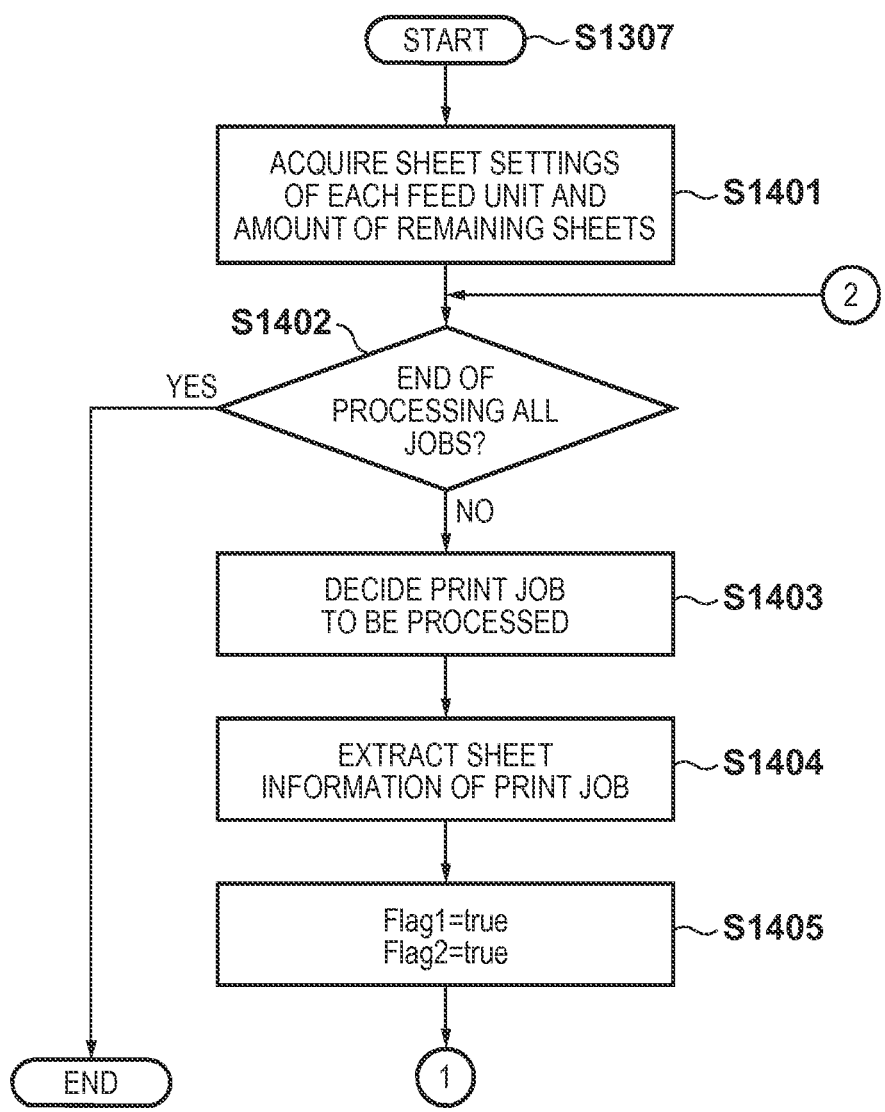

FIGS. 14A and 14B are flowcharts for describing details of the mismatch check process (step S1307) upon pressing the mismatch check button 704 according to the first embodiment. This process is achieved by executing, by the CPU 212 of the control unit 205, a program which is read out from the ROM 207 or HDD 209 and expanded in the RAM 208.

First, in step S1401, the CPU 212 acquires information of a sheet type set for each sheet feed unit of the digital printing apparatus 102 and the remaining amount of sheets. In the process of step S1401, the CPU 212 instructs the sheet manager 211 to look up, for example, the sheet management table as shown in FIG. 8. Then, the process advances to step S1402, and the CPU 212 determines whether the mismatch check process has been completed for all the print jobs. If the mismatch check process has been completed for all the print jobs, the process ends; if NO, the process advances to step S1403. In step S1403, the CPU 212 decides a print job to undergo the mismatch check process. The process advances to step S1404, and the CPU 212 acquires information of a sheet to be used by the print job, as shown in FIGS. 9A to 9C or the like, for the print job decided in step S1403. Thereafter, the process advances to step S1405, and the CPU 212 performs an initialization process to set true two types of flags (Flag 1 and Flag 2) for holding a mismatch check result. When Flag 1 is true, this represents a mismatch state in which the print job designates a sheet not set for any sheet feed unit. When Flag 2 is true, this represents that the print job designates a sheet set for a sheet feed unit but the remaining amount of sheets of this type is 0. Note that these two flags are set in the RAM 208.

The process advances to step S1406 (FIG. 14B), and the CPU 212 determines whether the check process has been completed for all the sheets to be used by the print job that have been extracted in step S1404 in the print job decided in step S1403. If the determination result in step S1406 is false, that is, if all the sheets have not been checked, the process advances to step S1407, and the CPU 212 decides a sheet to be checked among all the sheets to be used by the print job. Then, the process advances to step S1408, and the CPU 212 discriminates whether all the sheet feed units have been checked. If all the sheet feed units have not been checked, the process advances to step S1409, and the CPU 212 decides the next sheet feed unit. If all the sheet feed units have been checked, the process returns to step S1406, and the CPU 212 executes the comparison process for the next sheet.

If the discrimination result in step S1408 is false, there is a sheet feed unit not having undergone the comparison process. Thus, the process advances to step S1409, the CPU 212 decides a sheet feed unit to be checked, and the process advances to step S1410. In step S1410, the CPU 212 determines whether the sheet decided in step S1407 matches a sheet size and sheet type set for the sheet feed unit decided in step S1409. If the sheet does not match the sheet size and sheet type, the process returns to step S1408, and the CPU 212 executes the check process for the next sheet feed unit.

If the CPU 212 determines in step S1410 that the decided sheet matches the sheet size and sheet type set for the decided sheet feed unit, the process advances to step S1411, and the CPU 212 sets the value of Flag 1 to be "false". The process advances to step S1412, and the CPU 212 checks the remaining amount of sheets in the sheet feed unit decided in step S1409. If the CPU 212 discriminates that sheets remain, the process advances to step S1413, the CPU 212 sets the value of Flag 2 to be "false", and then the process returns to step S1408. If the discrimination result in step S1412 is false, that is, the remaining amount of the sheet feed unit is "0", the process returns to step S1408. If the CPU 212 discriminates in step S1408 that the comparison of sheet sizes and sheet types in all the sheet feed units has not ended, the process advances to step S1409, the CPU 212 sets a sheet feed unit to be checked as the next sheet feed unit and executes the above-described process. Upon completion of checking all the sheet feed units, the process advances to step S1406, and the CPU 212 determines whether all the sheets to be used by the current print job have been checked. If there is an unchecked sheet, the process advances to step S1407, and the CPU 212 performs the same process as the above-described one for the next sheet serving as a check target.

If the determination result in step S1406 is true, that is, mismatches between all the sheets to be used by the decided print job and the sheets of all the sheet feed units of the digital printing apparatus 102, and the presence/absence of sheets have been checked, the process advances to step S1414. In step S1414, the CPU 212 determines whether the value of the flag Flag 1 is "true". If the value of the flag Flag 1 is "true", this means that a sheet to be used by the print job decided in step S1403 is not set for any sheet feed unit of the digital printing apparatus 102. In this case, the process advances to step S1415, and the CPU 212 displays, for example, the warning mark 1102 representing the mismatch state in the field of this print job in the job hold list 702, as shown in FIG. 11. Then, the process returns to step S1402. If the determination result in step S1414 is false, the process advances to step S1416, and the CPU 212 determines whether the value of the flag Flag 2 is "true". That is, the CPU 212 discriminates whether the remaining amount of sheets is 0, though a sheet to be used by the print job selected in step S1403 is set for a sheet feed unit of the digital printing apparatus 102. If the discrimination result is true, the process advances to step S1417, and the CPU 212 displays, for example, the warning mark 1101 representing the sheet absence state in the field of this print job in the job hold list 702, as shown in FIG. 11. Then, the process returns to step S1402. If the discrimination result in step S1416 is false, the process returns to step S1402. If the CPU 212 determines in step S1402 that the check of sheets for all the selected print jobs has not been completed, the process advances to step S1403, and the CPU 212 sets a print job to be checked as the next print job and executes the above-described process.

Details of the mismatch check process in step S1307 of FIG. 13 have been explained.

As described above, according to the first embodiment, before executing the print process for a print job saved in the digital printing apparatus 102 by using the job hold function, it can be discriminated whether a sheet to be used by the print job has been set for a sheet feed unit. Further, whether the sheet exists in the sheet feed unit can be discriminated before the start of the print process. At this time, it can also be discriminated whether the sheet to be used by the selected print job is set for the sheet feed unit and whether the sheet actually exists while the sheet is set for the sheet feed unit.

[Second Embodiment]

The above-described first embodiment has exemplified a case in which either the warning mark 1101 or 1102 is displayed, as shown in FIG. 11. However, the state in which a sheet is set for a sheet feed unit but the remaining amount of sheets is 0, and the state in which a sheet to be used by a print job is not set for any sheet feed unit may occur at the same time. For example, assume that a print job uses a plurality of sheets, and a selected print job designates sheet A and sheet B.

Assume that sheet A is set for a sheet feed unit but the remaining amount of sheets is 0, and that sheet B is not set for any sheet feed unit. In this case, sheet A meets the condition to display the warning mark 1101 shown in FIG. 11, and sheet B corresponds to the condition to display the warning mark 1102. However, in the example of FIG. 11, it cannot be confirmed whether the remaining amount is 0 in all sheet feed units for sheet B.

FIG. 15 depicts a view illustrating an example of an operation screen of a job hold function displayed on a console unit 204 in a digital printing apparatus 102 according to the second embodiment of the present invention. The same reference numerals as those in FIG. 7 denote the same parts. FIG. 15 shows a screen after a mismatch check button 704 is pressed. The remaining behaviors and the building components of the screen are the same as those in the first embodiment, and a detailed description thereof will not be repeated. The hardware arrangement of the digital printing apparatus 102 according to the second embodiment is the same as that in the first embodiment, and a description thereof will not be repeated.

As shown in FIG. 15, both warning marks 1503 and 1504 are displayed at the job D portion. From this, for a plurality of sheets, the user can confirm the state in which a sheet is set for a sheet feed unit but the remaining amount of sheets is 0, and the state in which a sheet is not set for any sheet feed unit and the sheet does not exist in any sheet feed unit.

In FIG. 15, for example, when the user presses a details/change button 707 while selecting Job D, sheet sizes and sheet types (for example, FIG. 9B) to be used by Job D are displayed. A sheet which does not remain is displayed to be identifiable, and the display of a sheet feed unit for which the sheet is set is flickered. A sheet type not set for any sheet feed unit is highlighted and displayed. This display can present, to the user, a sheet of a sheet size and sheet type to be used by Job D for which the remaining amount of sheets is 0, the sheet feed unit of the sheet, and a sheet type not set for any sheet feed unit.

Figure 16A:
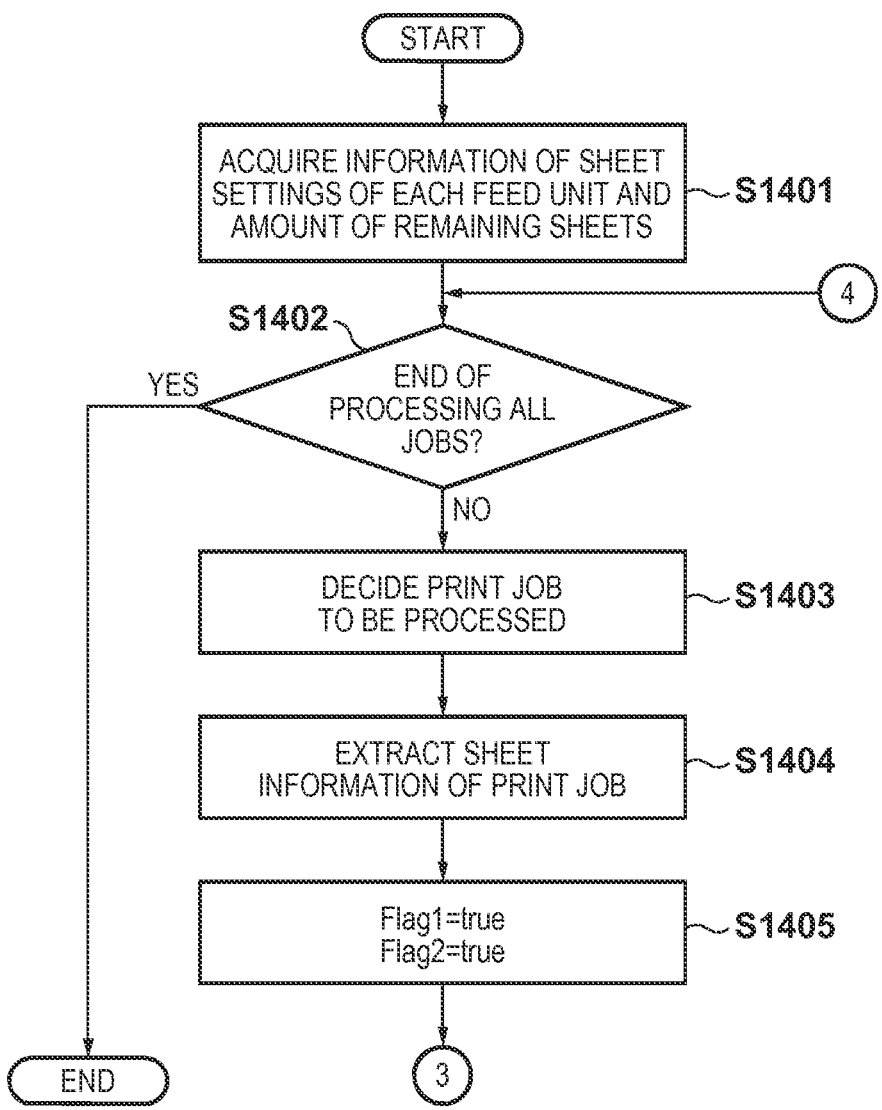

FIGS. 16A and 16B are flowcharts for describing details of the mismatch check process (step S1307) upon pressing the mismatch check button 704 according to the second embodiment. Note that the same reference numerals as those in FIGS. 14A and 14B according to the first embodiment denote the same parts. This process is achieved by executing, by a CPU 212 of a control unit 205, a program which is read out from a ROM 207 or HDD 209 and expanded in a RAM 208.

In FIGS. 14A and 14B, the process shifts to step S1402 after displaying a mismatch icon in step S1415. In FIGS. 16A and 16B, unlike FIGS. 14A and 14B, the process advances to step S1416 after step S1415, and after displaying the mismatch mark 1503 in FIG. 15, the process advances to a process of displaying the sheet absence mark 1504 in FIG. 15 if the sheet does not exist.

Accordingly, as shown in FIG. 15, the warning mark 1503 representing that a sheet is not set for any sheet feed unit, and the warning mark 1504 representing that a sheet does not exist in any sheet feed unit can be simultaneously displayed for one print job.

[Third Embodiment]

In FIG. 7 according to the first embodiment, a check target upon pressing by the mismatch check button 704 is only a print job selected in the job hold list 702 at the time of pressing the button 704.

Assume that the selection state of a print job is canceled after a warning mark 1101 or 1102 is displayed upon pressing a mismatch check button 704, as shown in FIG. 11. There is conceivable an embodiment in which the warning mark 1101 or 1102 is kept displayed even after the print job has become in a non-selected state.

The user executes various work operations by using the job hold screen as shown in FIG. 7. It highly likely occurs that the user performs various trial-and-error operations during this process. For example, the user cancels the selection state of a print job and selects the print job later again. Considering the convenience at the time of this operation by the user, even an unselected print job which has been selected once by the user and undergone a mismatch check serves as a print job candidate which may be selected later again. In such a situation, it is preferable to keep the warning marks 1101 and 1102 or the like displayed, rather than resetting the display of these marks when the selection state of a print job is canceled.

In the third embodiment, even when the selection state of a print job (Job D) is canceled, warning marks 1503 and 1504 representing mismatch check results are kept displayed, as shown in FIG. 17.

FIG. 17 depicts a view illustrating an example of an operation screen of a job hold function displayed on the console unit in the digital printing apparatus according to the third embodiment. FIG. 17 shows a screen after the mismatch check button 704 was pressed and the selection state of the print job (Job D) was cancelled.

[Fourth Embodiment]

After a mismatch check button 704 is pressed, a warning mark 1101 or 1102 is displayed for each job displayed in a job hold list 702 in FIG. 11 and equivalent drawings. After these marks are displayed, they are kept displayed till update by pressing the mismatch check button 704.

A further effect can be obtained by storing this display state in a nonvolatile way together with data and print settings of a print job stored in a save document storage area 512. That is, a mismatch check result can be saved permanently. For example, even when a digital printing apparatus 102 is turned off and then on, the result of a mismatch check executed before power-off can be held at the time of the next power-on. Upon power-on, the result of the mismatch check executed before power-off can be displayed in the job hold list 702 without pressing again the mismatch check button 704.

For example, even when the user turns off the printing apparatus 102 to interrupt operation during work and then turns it on to restart the work, the user can easily confirm the continuation of the work.

[Fifth Embodiment]

The fifth embodiment will explain an example of checking, for only a selected job, a sheet type necessary for the job and the remaining amount of sheets, and a sheet substitution process after executing the check.

Figure 18:
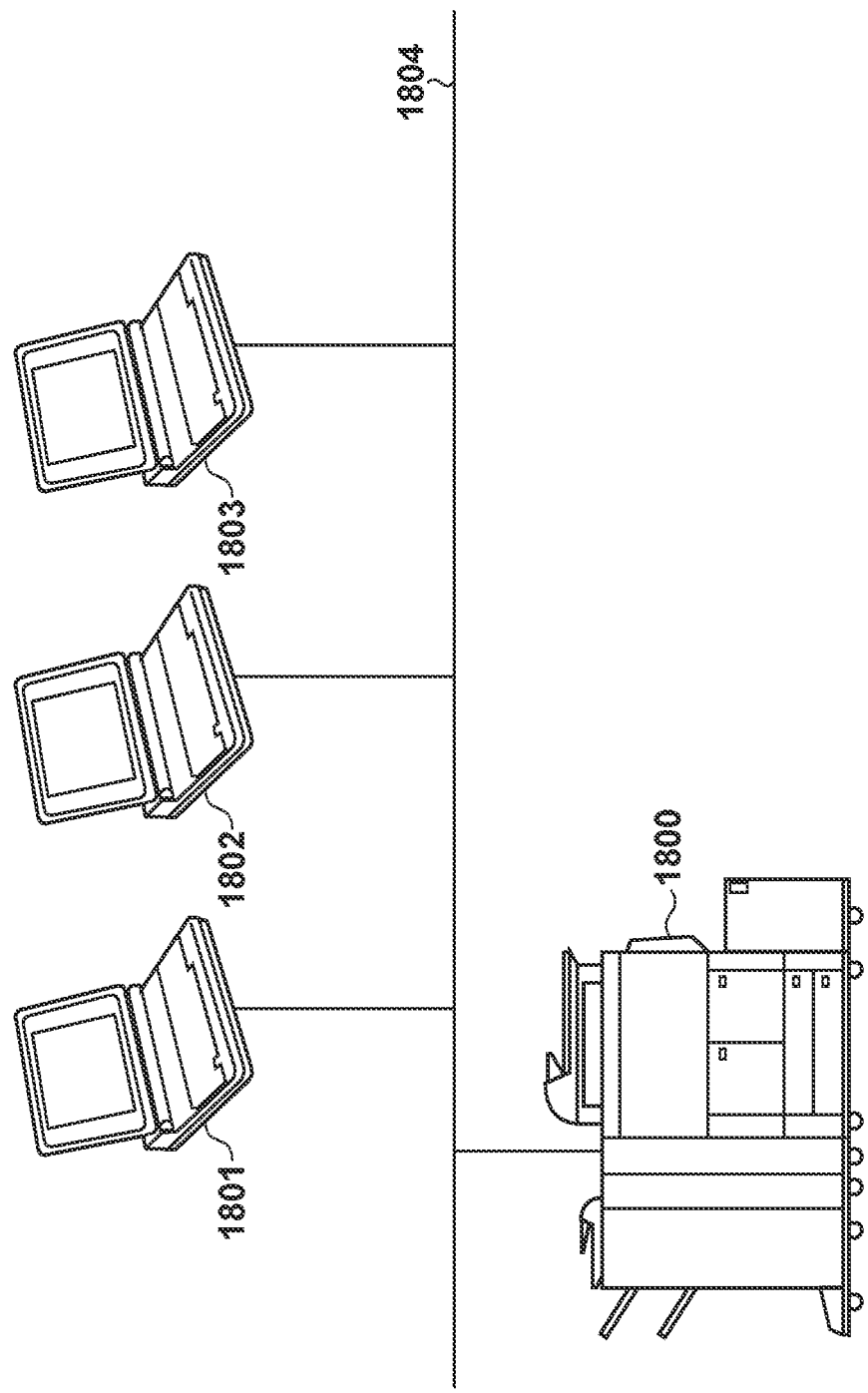
FIG. 18 depicts a schematic view for explaining a printing system according to a fifth embodiment.

FIG. 18 depicts a schematic view for explaining a printing system according to the fifth embodiment.

In FIG. 18, reference numerals 1801 to 1803 denote host computers. A printing apparatus 1800 is connected to the host computers 1801 to 1803 via a network 1804. The printing apparatus 1800 receives print jobs from the host computers 1801 to 1803 via the network 1804.

Figure 19:
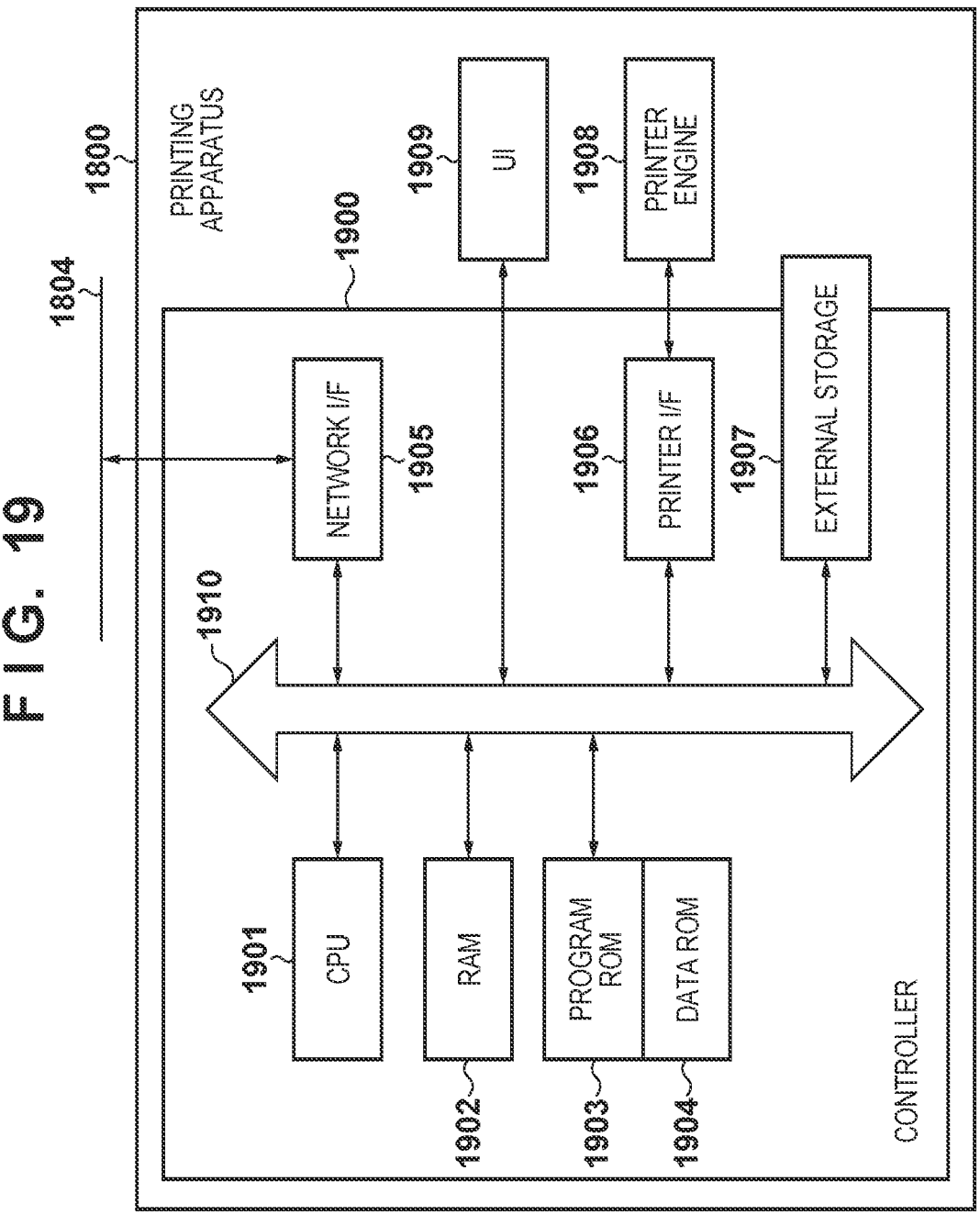
FIG. 19 is a block diagram showing the hardware arrangement of a controller in a printing apparatus according to the fifth embodiment.

FIG. 19 is a block diagram showing the hardware arrangement of a controller 1900 in the printing apparatus 1800 according to the fifth embodiment.

In FIG. 19, the controller 1900 includes a CPU 1901, RAM 1902, program ROM 1903, data ROM 1904, network interface (I/F) 1905, printer interface (I/F) 1906, and external storage 1907. The CPU 1901 controls the operation of the printing apparatus 1800 based on a program stored in the program ROM 1903. The RAM 1902 is used as a main memory when the CPU 1901 operates, and an area (work area) for temporarily storing information. The data ROM 1904 stores permanent information such as a font to be called when the CPU 1901 executes a program. The network I/F 1905 is connected to the network 1804 and receives a job from the host computer. The printer I/F 1906 connects a printer engine 1908 and the controller 1900. The external storage 1907 is a large-capacity storage such as a hard disk or flash memory. The CPU 1901, the RAM 1902, the ROMs 1903 and 1904, the I/Fs 1905 and 1906, the external storage 1907, and a UI (User Interface) 1909 are connected via a system bus 1910. The UI 1909 includes an operation panel including a touch panel, hard keys for accepting an operation by the user, and a display.

Figure 20:
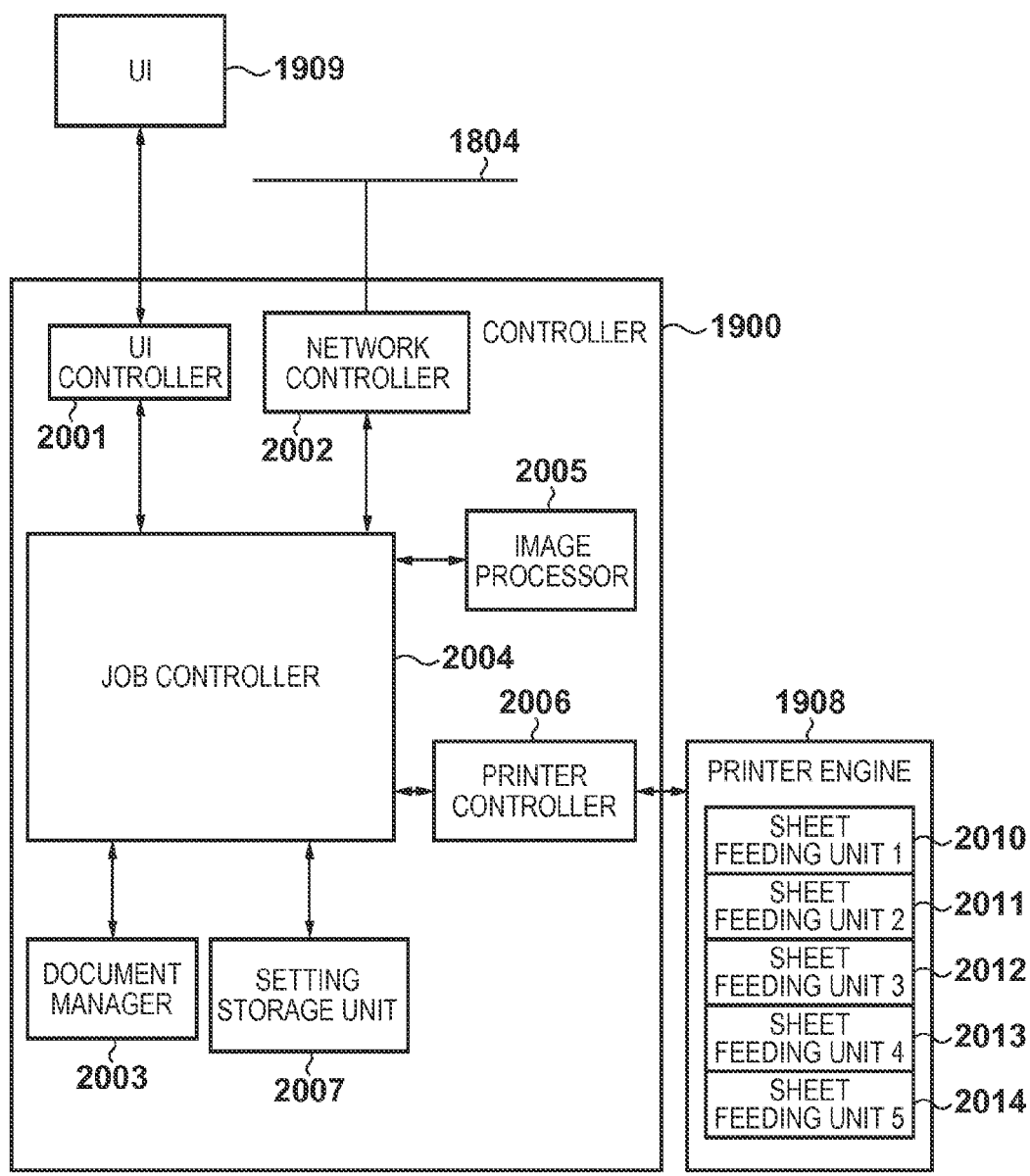
FIG. 20 is a block diagram showing the software arrangement of the controller and its peripheral arrangement in the printing apparatus according to the fifth embodiment.

FIG. 20 is a block diagram showing the software arrangement of the controller 1900 and its peripheral arrangement in the printing apparatus 1800 according to the fifth embodiment.

A UI controller 2001 connects the UI 1909 and a job controller 2004. A network controller 2002 controls the network I/F 1905. A document manager 2003 saves a job. The job controller 2004 controls execution of a job by the controller 1900. An image processor 2005 rasterizes an input job to generate image data for printing. A printer controller 2006 controls the printer engine 1908 via the printer I/F 1906. A setting storage unit 2007 stores various types of setting information set from the UI 1909, and stores even sheet settings. Sheet feed units 2010 to 2014 are mounted in the printer engine 1908. In this case, five sheet feed units are mounted.

With the above arrangement, an externally input hold job is temporarily stored in the external storage 1907 (FIG. 19) and managed by the document manager 2003. Note that the control process and management process by the units 2001 to 2007 are implemented by executing a program in the program ROM 1903 by the CPU 1901.

FIG. 21 depicts a view illustrating an example of a hold job list displayed on the UI 1909 in the printing apparatus according to the fifth embodiment.

A job list 2101 is a list of hold jobs held in the external storage 1907. The job list 2101 displays a predetermined number of held jobs. In the job list 2101, there are two states in which jobs are selected: a current selection state selected for one job as an operation target, and a multiple selection state selected for a plurality of jobs serving as operation targets. A currently selected job is always included in a plurality of selected jobs.

A current selection job 2102 is expressed by coloring the background of the job display. Three jobs (Job 1 to Job 3) 2102 to 2103 are a plurality of selected hold jobs, and numbers added to them express the order of selection. In FIG. 21, Job 1 to Job 3 are selected in the order named. Reference numeral 2104 denotes an update button; and numeral 2105 denotes an icon representing that a medium mismatch occurs in a job. By pressing the update button 2104, the mismatch icon 2105 is updated to the latest state. When there is no selected job, the update button 2104 is grayed out and cannot be pressed. A sheet substitution button 2106 is a transition button to a sheet substitution screen to perform sheet substitution (switch the sheet feeding source) for the current selection job. A print button 2107 is a button for instructing printing to execute a plurality of selected hold jobs in the selection order and print. If there is no current selection job, the sheet substitution button 2106 is grayed out and cannot be pressed. If there are a number of hold jobs which cannot be fit in the job list 2101, the user can press scroll buttons 2108 to display a list of hold jobs not currently displayed.

In FIG. 21, a medium mismatch occurs in Job 1. That is, when Job 1 requests a sheet size and sheet type set for each sheet feed unit to be used, it is represented in an identifiable manner that a sheet size and sheet type actually set for each sheet feed unit do not meet the request. In this case, the user presses the sheet substitution button 2106 while selecting Job 1, as shown in FIG. 21. In response to this, the screen changes to one in FIG. 22.

FIG. 22 depicts a view illustrating an example of a sheet substitution screen displayed on the UI 1909 in the printing apparatus 1800 according to the fifth embodiment. This screen appears when the sheet substitution button 2106 is pressed while a current selection job (for example, Job 1) is selected, as in the screen of FIG. 21.

Reference numeral 2201 denotes a list of sheets to be used by the current selection job (Job 1). The number in [ ] at the left end of this list indicates a sheet feed unit. For example, as represented by 2202, Job 1 requests sheet size A4 and a medium type (Plain paper) of sheet feed unit 1. Further, no substitute sheet is set for the sheet of sheet feed unit 1, and no medium mismatch has occurred. This means that a sheet of a size and type requested by Job 1 is set in sheet feed unit 1.

Reference numeral 2203 denotes a line indicating a currently selected sheet feed unit. The background of the line 2203 of the currently selected sheet feed unit is colored to represent that the sheet feed unit is being selected. As for the currently selected sheet feed unit, Job 1 requests sheet size A3 and a medium type (thick paper) of sheet feed unit 3. However, a sheet set for sheet feed unit 3 does not meet this condition. Hence, the sheet feed source is changed to sheet feed unit 4 so that a sheet of a size and type requested by Job 1 can be fed. An icon 2204 represents that a medium mismatch has occurred in sheet feed unit 3. The medium mismatch has occurred because Job 1 requests sheet size A3 and the medium type (thick paper) of sheet feed unit 3, but a sheet meeting this condition is not set for sheet feed unit 3. To solve this, sheet feed unit 4 storing a sheet of the sheet size and type requested by Job 1 is designated instead of sheet feed unit 3.

A "select change sheet" button 2205 is a button for changing to a screen for selecting a substitute sheet. For example, when the "select change sheet" button 2205 is pressed in the state of FIG. 22, the sheet feed unit requested by Job 1 is changed from sheet feed unit 3 to sheet feed unit 4. A "to sheet before change" button 2206 is a button for canceling the substitution setting for each sheet. An OK button 2207 is a button for settling a selected substitute sheet. A cancel button 2208 is a button for canceling a substitute sheet provisionally set on this screen.

FIGS. 23A and 23B are flowcharts for describing a process of displaying the job list screen by the controller 1900 in the printing apparatus 1800 according to the fifth embodiment. A program for executing this process is stored in the program ROM 1903 and executed by the CPU 1901, thereby achieving this process.

This process starts when an event to designate display of the job list screen is issued. First, in step S2301, a list of hold jobs managed and saved by the document manager 2003 is displayed in a predetermined order, as shown in FIG. 21. Note that the hold job is a job which was printed, or a job which was unprinted and is saved in the external storage 1907. When the job list screen is displayed for the first time or is displayed upon switching from another function, the CPU 1901 sets both the current selection job and multiple selection jobs to "none" in step S2302. Then, the process advances to step S2303, and the CPU 1901 waits for a user input operation using the UI 1909.

If any input is received in step S2303, the process advances to step S2304, and the CPU 1901 determines the type of input. If the input is, for example, a job selection instruction issued by touching a job in the job list 2101 with a user's finger, the process advances to step S2305 (FIG. 23B), and the CPU 1901 determines whether the job is a currently selected job (current selection job). If NO in step S2305, the process advances to step S2306, and the CPU 1901 displays the selected job as a current selected job with its background color, as represented by a reference numeral 2102 in FIG. 21. The process advances to step S2307, and the CPU 1901 determines whether the job is one of a plurality of selected jobs. If YES in step S2307, the process advances to step S2308, and the CPU 1901 adds the currently selected job as one of the plurality of selected jobs, assigns the number of the selection order, and redisplays the job list 2101. Thereafter, the process returns to step S2303 to wait for the next input from the UI 1909. If the CPU 1901 does not determine in step S2307 that the job is one of a plurality of selected jobs, the process returns to step S2303 without doing nothing for the number of the selection order.

If the CPU 1901 determines in step S2305 that the job has already been a current selected job, the process advances to step S2309, and the CPU 1901 determines to exclude the selected job from current selected jobs, and displays the job without the background color. The process advances to step S2310. If the job is included in multiple selection targets, the CPU 1901 excludes it from the targets, reassigns the number of the selection order to each job, and redisplays the job list 2101. The process returns to step S2303 (FIG. 23A) to wait for the next input from the UI 1909.

If the CPU 1901 determines in step S2304 that the update button 2104 has been pressed while a job is selected, the process advances to step S2311, and the CPU 1901 checks whether a medium mismatch has occurred in the selected job, updates the medium mismatch state, obtains the result, and displays it on the job list 2101. The process returns to step S2303 to wait for the next input from the UI 1909. The process in step S2311 will be explained with reference to the flowchart of FIG. 24.

If the CPU 1901 determines in step S2304 that another button has been operated, the process advances to step S2312 (FIG. 23B). In step S2312, the CPU 1901 determines whether the sheet substitution button 2106 in FIG. 21 has been pressed. If the sheet substitution button 2106 has not been pressed, the process advances to step S2315, the CPU 1901 performs a process corresponding to the pressed button, and then the process returns to step S2303. If the CPU 1901 determines in step S2312 that another button, for example, the print button 2107 has been pressed, a corresponding process of printing a plurality of selected jobs in the selection order is performed. However, the contents of this process are general ones, and a description thereof will be omitted.

If the CPU 1901 determines in step S2312 that the sheet substitution button 2106 has been pressed, the process advances to step S2313, and the CPU 1901 executes a sheet information display process to display a sheet substitution screen as shown in FIG. 22 for a currently selected job. After that, the process advances to step S2314, and the CPU 1901 checks a medium mismatch for the job, updates the state, and redisplays it on the job list 2101. The above-described process is continuously executed until the job list screen is switched to another screen. Note that the process in step S2313 will be described with reference to the flowcharts of FIGS. 25A and 25B.

According to this process, a list of hold jobs can be displayed on the UI 1909 to prompt the user to select a job from the job list and print it. At this time, it can be easily confirmed whether the size and type of a sheet to be used by the selected job for printing match those of a sheet set for a sheet feed unit. If the size and type of a sheet to be used by the selected job for printing do not match those of a sheet set for a sheet feed unit, another sheet feed unit storing the sheet of the size and type to be used by the job can be designated to execute the job.

Figure 24:
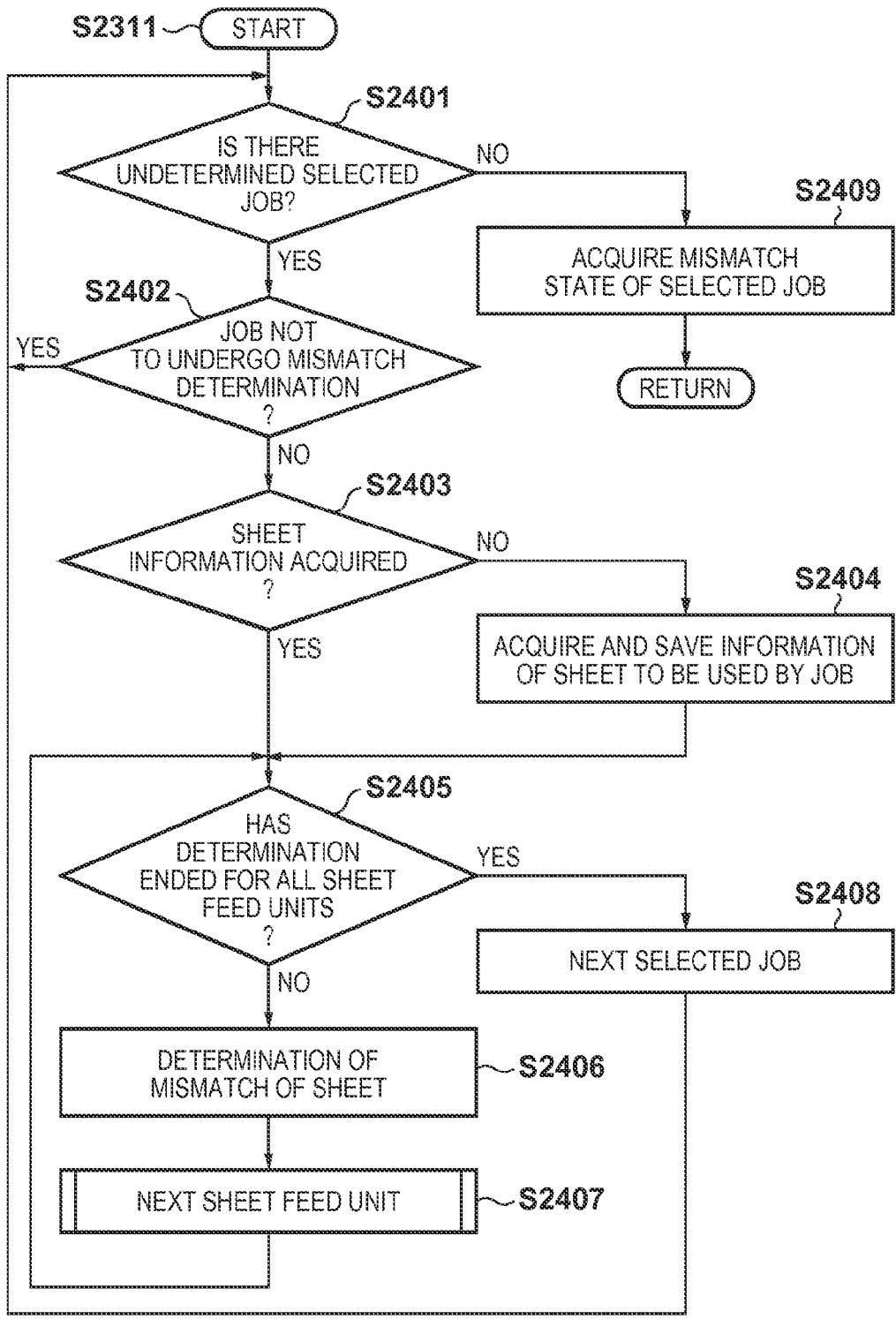
FIG. 24 is a flowchart for describing a process of determining the medium mismatch states of a plurality of selected jobs by the controller in the printing apparatus according to the fifth embodiment.

FIG. 24 is a flowchart for describing a process of determining the medium mismatch states of a plurality of selected jobs by the controller 1900 in the printing apparatus 1800 according to the fifth embodiment. A program for executing this process is stored in the program ROM 1903 and executed by the CPU 1901, thereby achieving this process. This process corresponds to details of the process in step S2311 of FIG. 23A.

First, in step S2401, the CPU 1901 determines whether a job not having undergone determination of the medium mismatch state exists in information of a plurality of selected jobs. If the process has ended for all the selected jobs, the process advances to step S2409. In step S2409, the CPU 1901 acquires the determination result of the medium mismatch state of the selected job, and ends this process.

If the CPU 1901 determines in step S2401 that there is a job not having undergone the determination process of the medium mismatch state, the process advances to step S2402, and the CPU 1901 determines whether the job is a medium mismatch determination target job. If the CPU 1901 determines that the job is not a target job, the process returns to step S2401 to perform the process for the next job. If the CPU 1901 determines in step S2402 that the job is a medium mismatch determination target job, the process advances to step S2403, and the CPU 1901 determines whether information of a sheet to be used by the job has already been acquired. If the CPU 1901 determines that the information has not been acquired yet, the process advances to step S2404, the CPU 1901 acquires and saves three attributes of the sheet feed unit, size, and medium type (sheet type) as information of a sheet to be used by the job, and then the process advances to step S2405. If sheets of the same sheet feed unit, sheet size, and medium type are used for different pages of one job, pieces of information are integrated as the same information. If the CPU 1901 determines in step S2403 that information of a sheet to be used by the job has already been acquired, the process advances to step S2405.

In step S2405, the CPU 1901 determines whether the determination process has ended for all the sheet feed units to be used by the job. If the determination process has ended for all the sheet feed units, the process advances to step S2408, the CPU 1901 selects the next job from selected jobs, and then the process advances to step S2401.

If the CPU 1901 determines in step S2405 that the determination process has not ended for all the sheet feed units to be used by the job, the process advances to step S2406, and the CPU 1901 determines, from the acquired sheet feed unit information, whether a medium mismatch has occurred in the sheet feed unit, and saves the determination result. The process advances to step S2407, the CPU 1901 sets the next sheet feed unit as a determination target, and the process advances to step S2405. If the CPU 1901 determines in step S2401 that the process has ended for all the selected jobs, it acquires the determination result of each saved job, and ends this process.

Accordingly, it can be determined for a selected job whether the sheet size and sheet type of a sheet feed unit requested by the job match a sheet size and sheet type actually set for the sheet feed unit. If a plurality of jobs are selected, it can be determined for each of the jobs whether the sheet size and sheet type of a sheet feed unit requested by the job match a sheet size and sheet type actually set for the sheet feed unit.

Figure 25A:
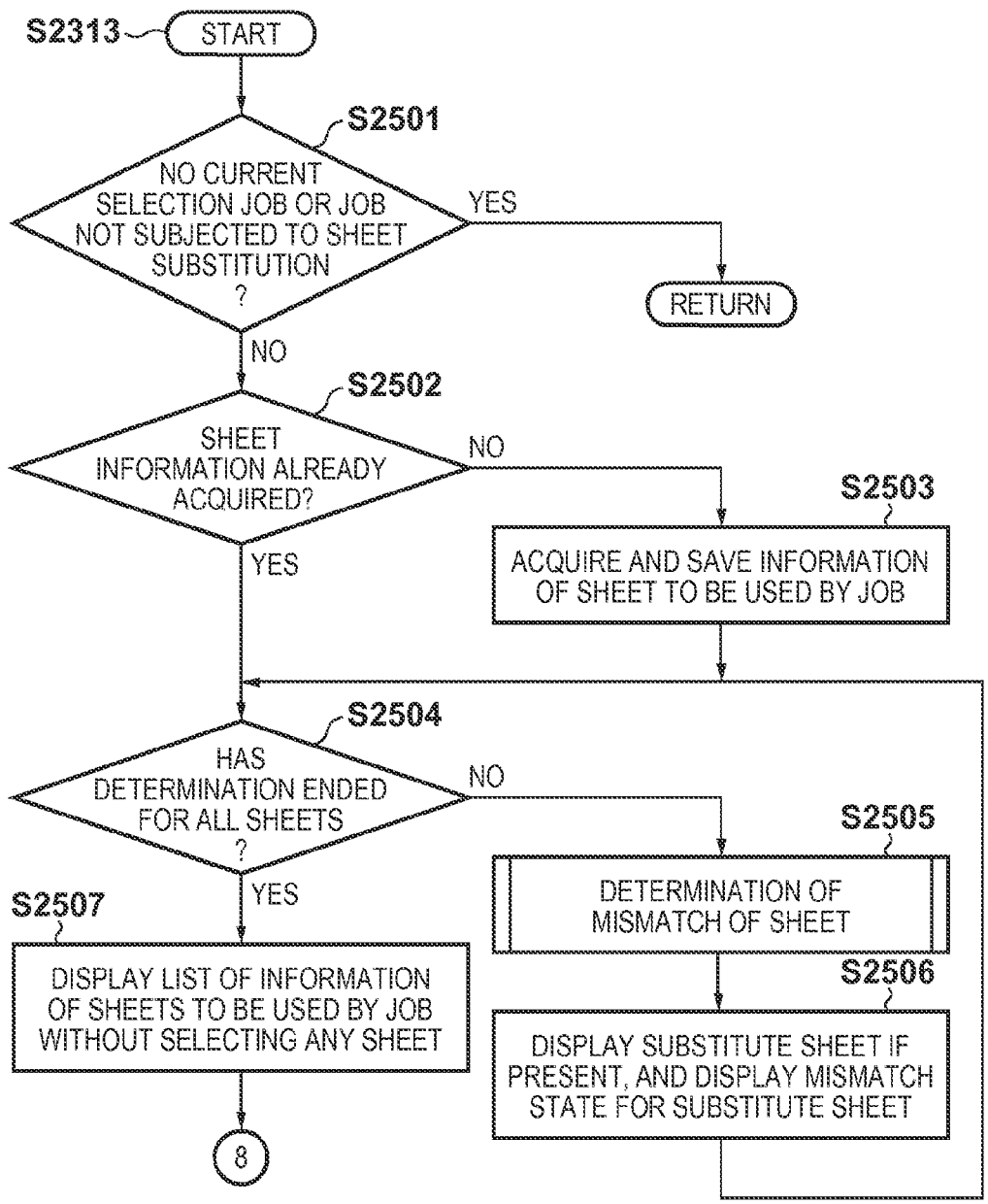
FIGS. 25A and 25B are flowcharts for describing a process of displaying the sheet substitution screen by the controller in the printing apparatus according to the fifth embodiment.
Figure 25B:
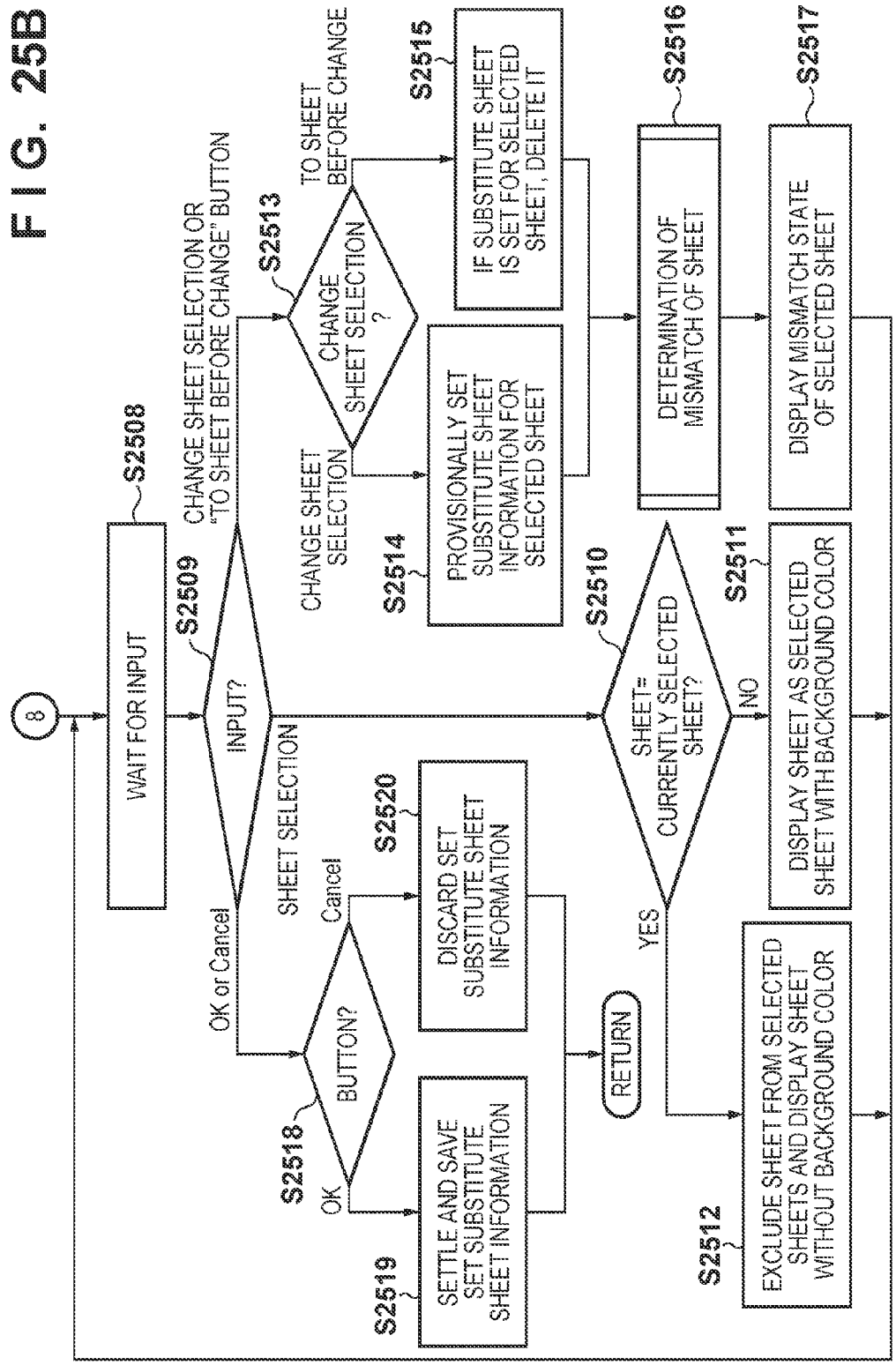

FIGS. 25A and 25B are flowcharts for describing a process of displaying the sheet substitution screen by the controller 1900 in the printing apparatus 1800 according to the fifth embodiment. A program for executing this process is stored in the program ROM 1903 and executed by the CPU 1901, thereby achieving this process. This process corresponds to details of the sheet substitution screen display process in step S2313 of FIG. 23B.

First, if the CPU 1901 determines in step S2501 that there is neither a current selection job nor a job not subjected to sheet substitution, this process ends without performing the sheet substitution screen display process. If NO in step S2501, the process advances to step S2502, and the CPU 1901 determines whether information of a sheet to be used by the job has already been acquired. If the sheet information has already been acquired, the process advances to step S2504. If the sheet information has not been acquired, the process advances to step S2503, and the CPU 1901 acquires and saves three attributes of the sheet feeding unit, size, and sheet type as the information of a sheet to be used by the job, similar to step S2404 of FIG. 24. The process then advances to step S2504.

In step S2504, the CPU 1901 determines whether the medium mismatch determination process has ended for all the sheets to be used by the job. If the determination process has ended for all the sheets, the process advances to step S2507. If NO in step S2504, the process advances to step S2505. In step S2505, the CPU 1901 determines a medium mismatch for each sheet as well as in step S2406 in FIG. 24. The process advances to step S2506, and if a substitute sheet has already been set, the CPU 1901 displays the substitute sheet information and a medium mismatch state for this sheet, and then the process returns to step S2504. Note that the process in step S2505 will be described with reference to the flowchart of FIG. 26.

In step S2507, the CPU 1901 displays an information list of sheets to be used by the job, as shown in FIG. 22, in a state in which no sheet is selected. The process then advances to step S2508 (FIG. 25B) to wait for an input from the UI 1909. If an input from the UI 1909 is received, the process advances to step S2509, and the CPU 1901 determines the input. If the CPU 1901 determines in step S2509 that the input is an instruction to select a sheet, the process advances to step S2510, and the CPU 1901 determines whether the sheet has not been selected. If the CPU 1901 determines that the sheet has not been selected, the process advances to step S2511, the CPU 1901 displays the sheet as a selected sheet with its background color, and then the process advances to step S2508. If the CPU 1901 determines that the sheet has already been selected, the process advances from step S2510 to step S2512, the CPU 1901 excludes the selected sheet from selected sheets and displays it without the background color, and then the process advances to step S2508. The processes in steps S2509 to S2512 are a process of switching selection/non-selection of sheet information.

If the CPU 1901 determines in step S2509 that the input is pressing of the "select change sheet" button 2205 in change sheet selection, the process advances to step S2514 via step S2513. In step S2514, the CPU 1901 provisionally sets a sheet selected on the sheet substitution screen (FIG. 22) as a substitute sheet, and the process advances to step S2516. If the CPU 1901 determines in step S2509 that the "to sheet before change" button 2206 has been pressed, the process advances to step S2515 via step S2513. In step S2515, if a substitute sheet is set for the selected sheet, the CPU 1901 deletes it, and the process advances to step S2516. In step S2516, the CPU 1901 determines a medium mismatch for the selected sheet as well as in step S2505. The process then advances to step S2517, the CPU 1901 updates the display of the icon 2204 representing the mismatch state of the selected sheet, and the process returns to step S2508. Note that the process in step S2516 will be described with reference to the flowchart of FIG. 26.

If pressing of the OK button 2207 or cancel button 2208 is received in step S2508, the process advances to step S2518. For the OK button 2207, the process advances to step S2519, and the CPU 1901 settles and saves the substitute sheet information set on this screen not as a provisional one but as an actual one, and ends the process. For the cancel button 2208, the process advances to step S2520, and the CPU 1901 discards the substitute sheet, deletion instruction, and the like set on this screen, validates original substitute sheet information, and ends the process.

Figure 26:
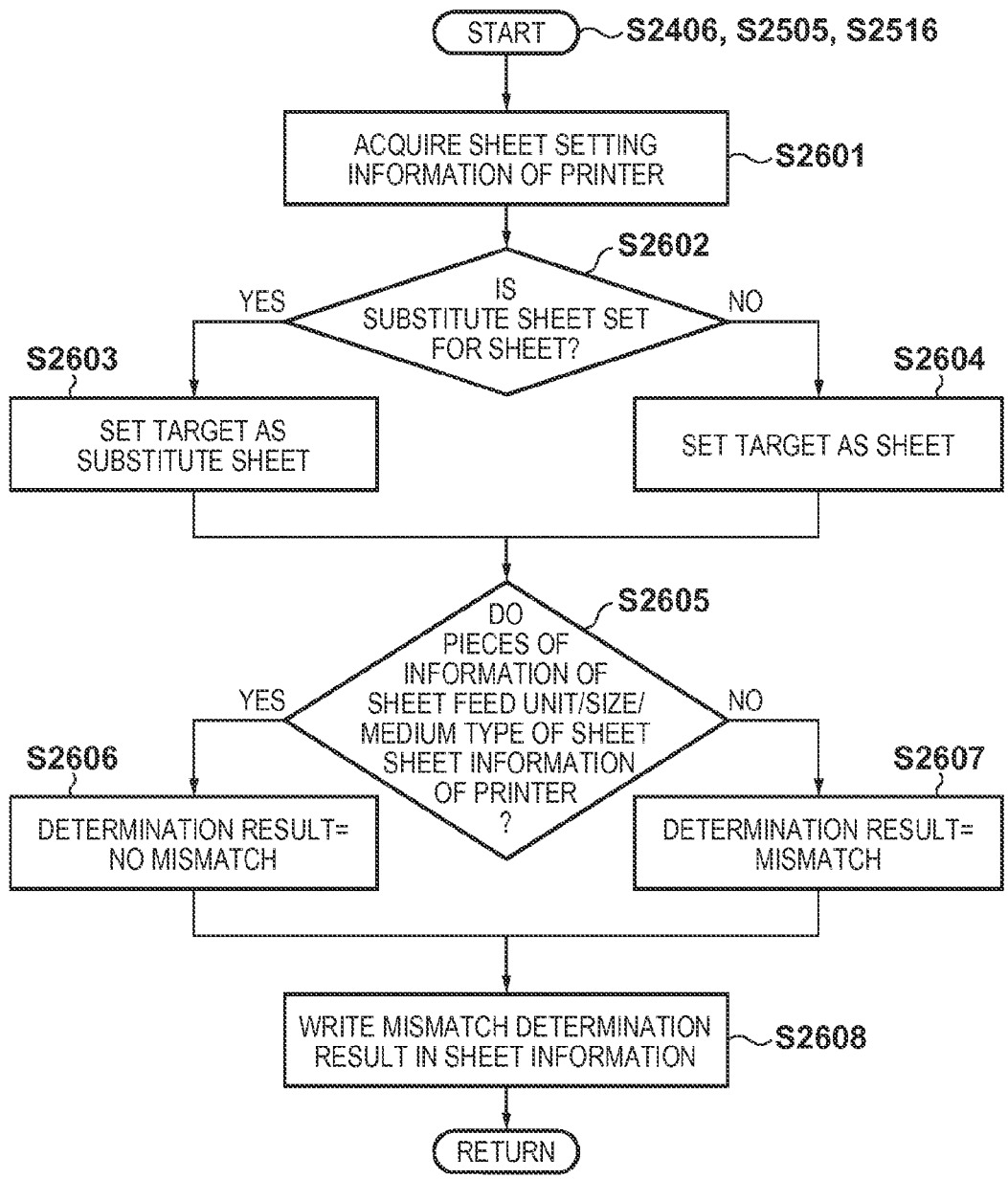
FIG. 26 is a flowchart for describing a process of determining the presence/absence of a medium mismatch for each sheet by the controller in the printing apparatus according to the fifth embodiment.

FIG. 26 is a flowchart for describing a process of determining the presence/absence of a medium mismatch for each sheet by the controller 1900 in the printing apparatus 1800 according to the fifth embodiment. A program for executing this process is stored in the program ROM 1903 and executed by the CPU 1901, thereby achieving this process. This process corresponds to details of the processes in step S2406 of FIG. 24 and steps S2505 and S2516 of FIG. 25B.

First, in step S2601, the CPU 1901 obtains, from the printer engine 1908, information of a sheet set for each sheet feed unit of the printer engine 1908. Some devices store sheet information not only in the printer engine 1908 but also in the controller 1900. In this case, these pieces of information are obtained from the setting storage unit 2007. The process advances to step S2602, and the CPU 1901 determines whether a substitute sheet is set for a sheet obtained from the job. If a substitute sheet is set, the process advances to step S2603, the CPU 1901 sets the substitute sheet as a determination target, and the process advances to step S2605. If no substitute sheet is set, the process advances to step S2604, the CPU 1901 sets the sheet itself as a determination target, and the process advances to step S2605.

In step S2605, the CPU 1901 determines whether all the pieces of information of the sheet feed unit, size, and medium type of the target sheet match the printer sheet information acquired in step S2601. If these pieces of information match the printer sheet information, the process advances to step S2606, the CPU 1901 determines that no medium mismatch has occurred, and the process advances to step S2608. If these pieces of information do not match the printer sheet information, the process advances to step S2607, the CPU 1901 determines that a medium mismatch has occurred, and the process advances to step S2608. In step S2608, the CPU 1901 writes the determination result in the sheet information and ends the process.

According to the above-described process, when the operator displays a hold job list, selects a plurality of jobs to be printed, and presses the update button 2104 before designating the start of printing, a medium mismatch is determined for each selected job and the result is displayed.

Even if many hold jobs exist, the number of jobs to be actually printed is not so large in general and is about several to 100 at most. For this reason, the medium mismatch determination is a process of about several seconds even by a CPU which is not a high-end one.

Only when the operator intentionally presses the update button 2104, the medium mismatch determination is performed. When, for example, the operator scrolls the job list to search for a job, no medium mismatch determination is performed. Thus, the operator does not feel stressed from slow display.

When the operator selects a job suffering a medium mismatch and displays the sheet substitution screen, a sheet suffering the medium mismatch can be recognized for each sheet, as shown in FIG. 22. As another advantage, the operator can quickly discriminate whether the medium mismatch will be canceled if another sheet is substituted to avoid the medium mismatch.

As described above, according to the fifth embodiment, when the operator designates printing of a hold job, he can confirm, before designating the start of printing, whether the sheet of a sheet feed unit designated by the job matches a sheet actually stored in the sheet feed unit. Since medium mismatch determination is performed for only a selected job and is not performed for other jobs, the time and burden for medium mismatch determination can be reduced.

If a sheet mismatch occurs, the operator can designate the sheet of a substitutable sheet feed unit by a simple operation, and a cumbersome operation by the operator can be eliminated.

[Sixth Embodiment]

In the fifth embodiment described above, the operator selects a plurality of jobs from a plurality of hold jobs and presses the update button 2104 to determine the presence/absence of a medium mismatch for the selected jobs. To the contrary, instantaneously when a job is selected, the presence/absence of a medium mismatch when executing the job may be determined. Even in this case, the process time can be shortened if the number of jobs is one. The sixth embodiment will be described, in which the presence/absence of a medium mismatch for a job is determined at the timing when the job is selected. The hardware arrangement and system configuration of an apparatus and the like according to the sixth embodiment are the same as those in the fifth embodiment, and a description thereof will not be repeated.

Figure 27A:
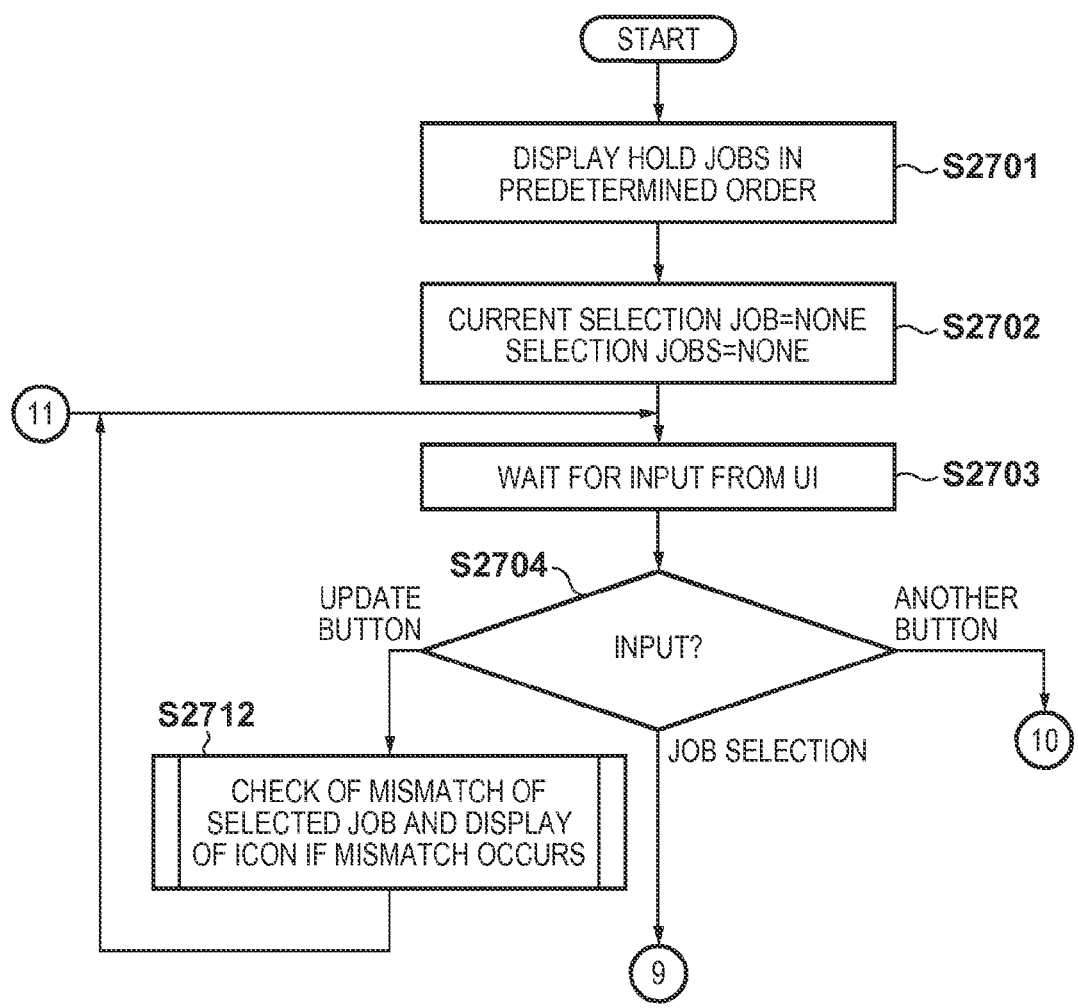

FIGS. 27A and 27B are flowcharts for describing a process of displaying a job list screen by a controller 1900 in a printing apparatus 1800 according to the sixth embodiment of the present invention. A program for executing this process is stored in a program ROM 1903 and executed by a CPU 1901, thereby achieving this process.

Note that processes in steps S2701 to S2708 and S2710 to S2716 are the same as those in steps S2301 to S2315 of FIGS. 23A and 23B in the fifth embodiment, and a description thereof will not be repeated.

Unlike the fifth embodiment, in step S2707, the CPU 1901 determines whether the job is included in a plurality of selected jobs. If the job is included in a plurality of selected jobs, the process advances to step S2708, the CPU 1901 adds the job as one of the plurality of selected jobs and assigns a number of the selection order, and then the process advances to step S2709. If the CPU 1901 determines in step S2707 that the job is not included in a plurality of selected jobs, the process advances to step S2709. In step S2709, the CPU 1901 determines the presence/absence of a medium mismatch for the job, and if a mismatch occurs, adds an icon and redisplays a job list 2101. After that, the process advances to step S2703 to wait for the next input.

According to the above-described process, when the operator displays a hold job list and selects a job to be printed, the presence/absence of a medium mismatch is determined for the job every time the job is selected. This process is executed for each job, and is a process of about several tens of milliseconds even by a CPU which is not a high-end one. Hence, the operator does not feel stressed from slow display of the screen or the like.

Since the presence/absence of medium mismatch is not determined when the job list is scrolled to search for a job, similar to the fifth embodiment, the operator does not feel stressed from slow display.

Determination of the presence/absence of a medium mismatch may take the time of several seconds for a UI capable of selecting 100 jobs from the top at once or a UI capable of designating a range, instead of selecting jobs one by one from the job list. However, the total time is not so different from the time taken until the update button is pressed after selecting a job, so it is considered that the operator would not particularly feel unnatural. For an operator who does not require determination of the presence/absence of a medium mismatch every time a job is selected, it suffices to switch the method in the sixth embodiment to the one in the fifth embodiment.

[Seventh Embodiment]

In the fifth embodiment described above, the presence/absence of a medium mismatch is determined on the premise that all pieces of information such as the sheet size, sheet feed unit, and medium type are prepared for a sheet to be used by a job. However, all these pieces of information are rarely set for the sheet of an actually input job. For example, "AUTO" may be set without designating a sheet feed unit in the designation of a job, and the printing apparatus may automatically search a sheet feed unit for a sheet matching the job and feed the sheet. Alternatively, a job may designate only a sheet feed unit and designate neither a sheet size nor medium type, like a front cover, back cover, and insertion sheet. In this case, a match occurs for only the sheet feed unit, and a mismatch occurs for the sheet size and medium type. For all jobs using an insertion sheet, it is determined that a medium mismatch occurs.

As another problem, a sheet size and medium type are set as information of a sheet set for a sheet feed unit, but the sheet feed unit is pulled out from an actual printing apparatus and cannot feed a sheet. Even if the sheet feed unit is closed, no sheet may be stored (sheets run out).

The seventh embodiment in which the presence/absence of a medium mismatch is determined in these cases will be described. The hardware arrangement and system configuration of an apparatus and the like according to the seventh embodiment are the same as those in the fifth embodiment, and a description thereof will not be repeated.

Figure 28A:
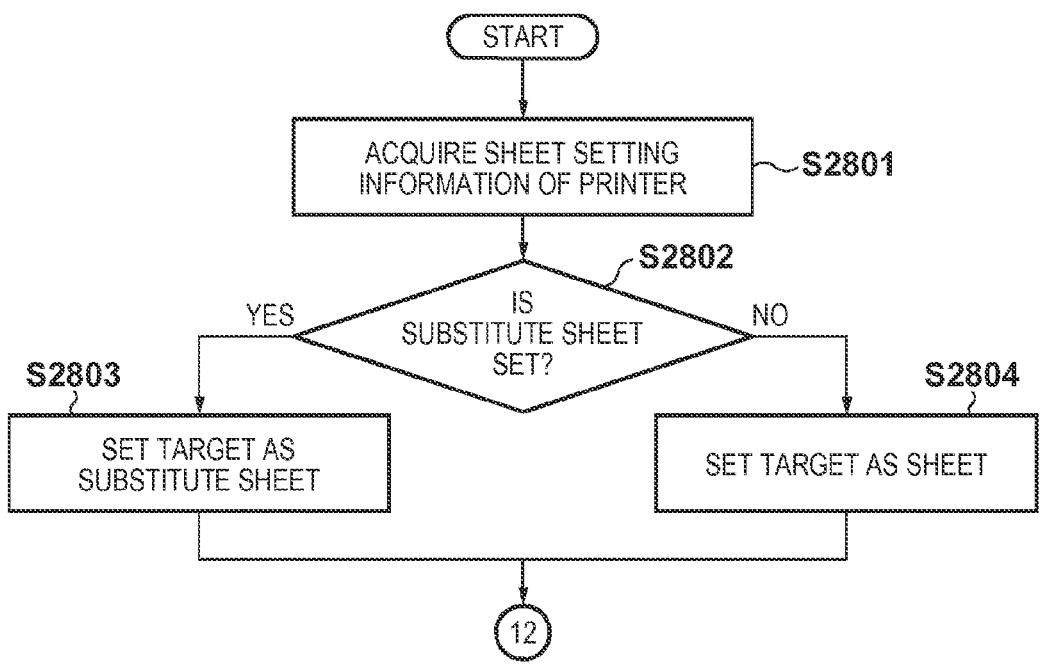

FIGS. 28A and 28B are flowcharts for describing a process of determining the presence/absence of a medium mismatch for each sheet by a controller 1900 in a printing apparatus 1800 according to the seventh embodiment of the present invention. A program for executing this process is stored in a program ROM 1903 and executed by a CPU 1901, thereby achieving this process. This process corresponds to details of the processes in step S2406 of FIG. 24 and steps S2505 and S2516 of FIGS. 25A and 25B. Note that processes in steps S2801 to S2804 are the same as those in steps S2601 to S2604 of FIG. 26, and a description thereof will not be repeated.

In step S2805, the CPU 1901 determines whether the designation of the sheet feed unit of a sheet for a target job is "AUTO". If the designation is "AUTO", the process advances to step S2806. In step S2806, the CPU 1901 determines whether a sheet feed unit storing a sheet matching the designated sheet size and medium type exists among the sheet feed units of the printing apparatus 1800. If there is a matching sheet feed unit, the process advances to step S2807, and the CPU 1901 determines whether the sheet feed unit runs out of sheets. If the CPU 1901 determines in step S2807 that the sheet feed unit does not run out of sheets, the process advances to step S2808, and the CPU 1901 determines whether the sheet feed unit has been pulled out. If the CPU 1901 determines that the sheet feed unit has not been pulled out (has not been opened), the process advances to step S2809, the CPU 1901 determines that no mismatch has occurred, and the process advances to step S2811.

If the CPU 1901 determines in step S2806 that a sheet matching the sheet size and medium type does not exist in any sheet feed unit, determines in step S2807 that the sheet feed unit runs out of sheets, or determines in step S2808 that the sheet feed unit has been opened, the process advances to step S2810. In step S2810, the CPU 1901 determines that a mismatch has occurred, the process advances to step S2811, and the CPU 1901 writes the determination result in the sheet information of the job and ends the process.

If the CPU 1901 determines in step S2805 that the designation of the sheet feed unit of a sheet designated by the target job is not "AUTO" but a sheet feed unit is specifically designated, the process advances to step S2812, and the CPU 1901 further checks the designation of the sheet size and medium type of the job. If neither the sheet size nor medium type is designated, the process advances to step S2813, and the CPU 1901 obtains, from sheet setting information of the printing apparatus, information of a sheet size and medium type set for the designated sheet feed unit. The CPU 1901 employs the sheet size and medium type set for the sheet feed unit as the sheet size and medium type of the job, and then the process advances to step S2814. If the CPU 1901 determines in step S2812 that the job designates one or both of the sheet size and medium type, the process advances to step S2814.

In step S2814, the CPU 1901 determines whether the sheet of the designated sheet feed unit matches the sheet size and medium type. If there is a matching sheet feed unit, the process advances to step S2807; if NO, to step S2810. In step S2810, the CPU 1901 determines that a mismatch has occurred, the process advances to step S2811, and the CPU 1901 writes the determination result in the sheet information of the job and ends the process.

According to the above-described process, when the designation of the sheet feed unit of a sheet to be used by a held job is "AUTO", the sheet feed units of the printing apparatus is searched for a sheet feed unit storing a sheet matching the sheet size and medium type. If there is a matching sheet feed unit, no medium mismatch occurs. However, if no matching sheet exists in any sheet feed unit, it is determined that a medium mismatch occurs.

When sheets to be used by a job include a sheet which is simply fed and superimposed on a product without printing, like a front cover, back cover, or insertion sheet, the size and medium type of the designated sheet are set for the designated sheet feed unit before determining whether a medium mismatch occurs.

If the sheet exists in the sheet feed unit, no medium mismatch occurs; if it does not exist, a medium mismatch occurs owing to the absence of the sheet.

Further, when the sheet feed unit runs out of sheets or when the sheet feed unit is opened and cannot feed a sheet, it is determined that a medium mismatch occurs.

The present invention is not limited to the above-described embodiments, and various modifications (including organic combinations of the embodiments) can be made based on the gist of the present invention and are not intended to be excluded from the scope of the present invention. For example, in the above-described embodiment, the CPU of the control unit 205 of the digital printing apparatus 102 serves as a main processor for the various control operations. However, it may be configured to be able to execute some or all of the various control operations by, for example, the external controller of a housing different from the digital printing apparatus 102.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-274054, filed Dec. 24, 2012 and 2013-123174, filed Jun. 11, 2013, which are hereby incorporated by reference herein in their entirety.

What is claimed is:

1. A printing apparatus which is able to convey a sheet from at least one of a plurality of sheet storage units and print an image on the sheet, comprising:
    a holding unit configured to hold a print job, the holding unit being able to hold print jobs;
    a determination unit configured to determine whether or not there is at least one sheet storage unit for which attribution information of a sheet to be used by a print job held in the holding unit is registered, in the plurality of sheet storage units;
    a notification unit configured to notify, based on the determination by the determination unit, that there is no sheet storage unit for which the attribution information of a sheet to be used by the print job held in the holding unit is registered;

a selection instruction receiving unit configured to receive, from a user, a selection instruction for selecting at least one print job from among the print jobs held by the holding unit;

an executing instruction receiving unit configured to receive, from a user, an executing instruction for the at least one print job selected by the selection instruction; and an executing unit configured to execute the at least one print job selected by the selection instruction according to the executing instruction received by the executing instruction receiving unit.

2. The printing apparatus according to claim 1, wherein the notification unit configured to notify, in a case where the determination unit determines that there is no sheet storage unit for which the attribution information of the sheet to be used by the print job held in the holding unit is registered, that there is no sheet storage unit for which the attribution information of the sheet to be used by the print job held in the holding unit is registered.

3. The printing apparatus according to claim 2, wherein the notification unit notifies that there is no sheet storage unit for which the attribution information of the sheet to be used by the print job held in the holding unit is registered by displaying a mark.

4. The printing apparatus according to claim 1, further comprising
a judgment unit configured to judge, in a case where the determination unit determines that there is the at least one sheet storage unit for which the attribution information of the sheet to be used by the print job held in the holding unit is registered, whether or not a sheet exists in the sheet storage unit.

5. The printing apparatus according to claim 4, further comprising:
a second notification unit configured to notify, in a case where the determination unit determines that there is the at least one sheet storage unit for which the attribution information of the sheet to be used by the print job held in the holding unit is registered and the judgment unit judges that a sheet does not exist in the sheet storage unit, that a sheet does not exist in the sheet storage unit.

6. The printing apparatus according to claim 5, wherein the second notification unit notifies that a sheet does not exist in the sheet storage unit by displaying a mark.

7. The printing apparatus according to claim 1,
wherein the determination unit determines, before the executing receiving unit receives the execution instruction, whether or not there is at least one sheet storage unit for which the attribution information of the sheet to be used by the print job held in the holding unit is registered, in the plurality of sheet storage units.

8. The printing apparatus according to claim 1, further comprising a display unit configured to display a list of print jobs held in the holding unit.

9. The printing apparatus according to claim 1, further comprising a determination instructions receiving unit configured to receive a determination instruction for causing the determination unit to perform the determination.

10. The printing apparatus according to claim 1, wherein the attribution information of the sheet is a size of a sheet or a type of a sheet.

11. A control method for controlling a printing apparatus which is able to convey at least one of from a plurality of sheet storage units and print an image on the sheet, comprising:
holding a print job in a holding unit, the holding unit being able to print jobs;
determining whether or not there is at least one sheet storage unit for which attribution information of a sheet to be used by a print job held in the holding unit is registered, in the plurality of sheet storage units;
notifying, based on the determination, that there is no sheet storage unit for which the attribution information of a sheet to be used by the print job held in the holding unit is registered;
receiving, from a user, a selection instruction for selecting at least one print job from among print jobs held by the holding unit;
receiving, from a user, an executing instruction for the at least one print job selected by the selection instruction; and
executing the print job selected by the selection instruction according to the received executing instruction.

12. A non-transitory computer readable storage medium storing a program for causing a computer to execute a method, the method comprising,
holding, holding a print job in a holding unit, the holding unit being able to print jobs;
determining whether or not there is at least one sheet storage unit for which attribution information of a sheet to be used by a print job held in the holding unit is registered, in the plurality of sheet storage units;
notifying, based on the determination, that there is no sheet storage unit for which the attribution information of a sheet to be used by the print job held in the holding unit is registered;
receiving, from a user, a selection instruction for selecting at least one print job from among print jobs held by the holding unit;
receiving, from a user, an executing instruction for the at least one print job selected by the selection instruction; and
executing the print job selected by the selection instruction according to the received executing instruction.

* * * * *